United States Patent [19]

Maucher et al.

[11] Patent Number: 4,890,712

[45] Date of Patent: * Jan. 2, 1990

[54] TORSIONAL VIBRATION DAMPING DEVICE FOR CLUTCH PLATES

[75] Inventors: Paul Maucher, Sasbach; Rudolf Hönemann, Ottersweier, both of Fed. Rep. of Germany

[73] Assignee: Luk Lamellen und Kupplungsbau GmbH, Bühl, Fed. Rep. of Germany

[*] Notice: The portion of the term of this patent subsequent to Oct. 20, 2004 has been disclaimed.

[21] Appl. No.: 946,496

[22] Filed: Dec. 24, 1986

Related U.S. Application Data

[63] Continuation-in-part of Ser. No. 853,720, Apr. 18, 1986, abandoned, and a continuation-in-part of Ser. No. 863,614, May 15, 1986, abandoned, and a continuation-in-part of Ser. No. 931,943, Nov. 19, 1986, Pat. No. 4,700,822, which is a continuation of Ser. No. 801,565, Nov. 25, 1985, abandoned.

[30] Foreign Application Priority Data

Mar. 1, 1986 [DE] Fed. Rep. of Germany ....... 3606710

[51] Int. Cl.⁴ .............................. F16D 3/12; F16D 3/66
[52] U.S. Cl. .................................... 192/106.2; 464/68
[58] Field of Search .............. 192/106.2, 106.1, 70.17, 192/30 V; 464/68, 66, 63

[56] References Cited

U.S. PATENT DOCUMENTS

| | | | |
|---|---|---|---|
| 2,158,244 | 5/1939 | Mistretta et al. | 192/106.2 |
| 3,799,309 | 3/1974 | Cook | 192/106.2 |
| 4,006,809 | 2/1977 | Seino et al. | 192/106.2 |
| 4,603,767 | 8/1986 | Blond | 192/106.2 |
| 4,700,821 | 10/1987 | Mancher et al. | 192/106.2 |
| 4,700,822 | 10/1987 | Mancher et al. | 192/106.2 |

FOREIGN PATENT DOCUMENTS

| | | |
|---|---|---|
| 2256582 | 5/1973 | Fed. Rep. of Germany ... 192/106.2 |
| 3537324 | 4/1987 | Fed. Rep. of Germany . |
| 3805595 | 9/1988 | Fed. Rep. of Germany . |
| 2503295 | 10/1982 | France . |
| 2080488 | 2/1982 | United Kingdom . |

*Primary Examiner*—Leslie A. Braun
*Assistant Examiner*—Richard M. Lorence
*Attorney, Agent, or Firm*—Peter K. Kontler

[57] ABSTRACT

A friction clutch plate wherein friction linings which receive torque from the crankshaft of an internal combustion are mounted on one disc of a twin-disc input element forming part of a first damper of torsional vibrations. The output element of the first damper is a flange between the two discs and such flange can turn relative to the discs against the opposition of a set of relatively weak coil springs. The flange is made of a synthetic material. One of the discs forms part of the input element of a second damper whose output element is a flange mounted on the hub for the input shaft of a change-speed transmission with a certain amount of angular play. The flange of the first damper has internal teeth mating without play with the external teeth of the hub. The first damper operates alone during a first stage of angular movement of the one disc relative to the hub, and the two dampers cooperate during the next stage of such angular movement. The coil springs can be confined in pockets of the input and/or output element, and such element or elements can be made of a synthetic material and can act as friction rings.

113 Claims, 11 Drawing Sheets

TORSIONAL VIBRATION DAMPING DEVICE FOR CLUTCH PLATES

CROSS-REFERENCE TO RELATED CASES

This is a continuation-in-part of our copending patent applications Ser. Nos. 853,720, (filed Apr. 18, 1986), now abandoned, 863,614 (filed May 15, 1986) now abandoned and 931,943 (filed Nov. 19, 1986) now U.S. Pat. No. 4,700,822 which is a continuation of Ser. No. 801,565 (filed Nov. 25, 1985) now abandoned.

The clutch plate of the present invention is similar to those disclosed in our commonly owned copending patent application Ser. No. 799,007 filed Nov. 18, 1985 for "Clutch plate" now U.S. Pat. No. 4,700,821.

BACKGROUND OF THE INVENTION

The invention relates to improvements in torsional vibration damping devices, especially to improvements in damping devices which can be installed in the clutch plates or clutch discs of frictional clutches for motor vehicles.

Published British patent application No. A-20 80 488 discloses a clutch plate having a torsional vibration damping device with a first damper and a second or main damper. The first damper employs a set of relatively weak coil springs which oppose angular movements of an input member and an output member relative to each other, and the main damper employs stronger coil springs which oppose angular movements of an input member and an output member relative to each other. The output means of the clutch plate is a hub which can transmit torque to the input shaft of a change-speed transmission in the power train between the internal combustion engine and the wheels of a motor vehicle.

A drawback of the clutch plate which is disclosed in the published British patent application is that the first damper must be preassembled at the outer side of one of two disc-shaped walls forming part of input means of the clutch plate. The first damper comprises a large number of parts including a pair of spaced-apart plate-like guides for a flange which is disposed between the guides. The guides must be affixed to one of the walls by a set of rivets. This contributes to the initial cost of the clutch plate. Moreover, the just discussed clutch plate is bulky (particularly in the axial direction of the hub) which creates problems when it is to be used in the friction clutch between the crankshaft of the engine and the input shaft of the change-speed transmission in a compact motor vehicle.

Published French patent application Ser. No. 2 503 295 of Muller discloses a torsion damping assembly wherein the first damping stage is disposed radially inwardly of and is surrounded by the second damping stage, i.e., the two damping stages are in radial alignment with each other. Such torsion damping assemblies are quite bulky (especially as considered in the radial direction of the clutch plate), namely even bulkier than the torsion damping assemblies of the type disclosed in the published British patent application No. A-20 80 488.

OBJECTS AND SUMMARY OF THE INVENTION

An object of the invention is to provide a novel and improved torsional vibration damping device which is less expensive than the aforediscussed prior damping devices and occupies less room in a motor vehicle.

Another object of the invention is to provide a torsional vibration damping device which comprises a small number of simple parts and can be assembled, at least in part, in automatic machinery.

A further object of the invention is to provide a reliable damping device which can be installed in existing friction clutches and in existing types of clutch plates as a superior substitute for conventional damping devices.

An additional object of the invention is to provide a clutch plate which embodies the above outlined damping device and to provide a friction clutch which embodies a clutch plate utilizing the improved damping device.

A further object of the invention is to provide a novel and improved array of parts in a damping device and in a clutch plate of the above outlined character.

Another object of the invention is to provide novel and improved dampers for use in the above outlined damping device, and to provide novel and improved means for ensuring the transmission and adequate damping of torque between the component parts of such dampers.

Still another object of the invention is to provide a torsional vibration damping device wherein the parts of the damper means are designed with a view to ensure predictable and optimum assembly in a time-saving operation.

A further object of the invention is to provide a power train which embodies the improved torsional vibration damping device.

Another object of the invention is to provide a novel and improved method of mounting coil springs or analogous energy storing components between coaxial input and output elements of a damper for use in torsional vibration damping devices.

An additional object of the invention is to provide a torsional vibration damping device with a damper wherein the forces acting upon the energy storing components of the damper are distributed and applied with a higher degree of uniformity and predictability than in heretofore known dampers.

A further object of the invention is to provide a multistage torsion damping assembly which is not only simpler but also more compact than conventional torsion damping assemblies.

Another object of the invention is to provide a torsion damping assembly whose space requirements, as considered in the axial and radial directions of its rotary parts, are smaller than those of the aforedescribed presently known assemblies.

A further object of the invention is to provide a torque damping assembly whose installation in a friction clutch or the like is simpler and less time-consuming than the installation of presently known assemblies.

An additional object of the invention is to provide an assembly which comprises a relatively small number of simple and inexpensive parts, certain parts of which can be mass-produced at a very low cost, and which can furnish a highly satisfactory torsion damping action.

Still another object of the invention is to provide a torsion damping assembly wherein several parts can perform plural functions to thus allow for a reduction of the overall number of parts.

The improved torsional vibration damping device can be used with particular advantage in the clutch plate of a friction clutch which is disposed in the power train between the output shaft of the internal combustion engine and the input shaft of the change-speed transmission in a motor vehicle, and comprises a damper including coaxial annular rotary input and output elements and coil springs or other suitable energy storing components interposed between and yieldably opposing angular movements of the input and output elements relative to each other. At least one of the two elements contains (and can be made of) a suitable synthetic material and is provided with substantially circumferentially extending pockets for the energy storing components. Each energy storing component preferably extends substantially tangentially of the input and output elements and includes first and second end portions (such as the end convolutions of a coil spring). The one element has pairs of abutments provided in the pockets for the end portions of the corresponding energy storing components. If the energy storing components have a substantially circular cross-sectional outline (as mentioned above, such components can constitute coil springs), the one element preferably surrounds each energy storing component along an arc of at least 180 degrees, as considered in the circumferential direction of the energy storing components. The one element (and/or each abutment of the one element) can contact each energy storing component (or the respective component) at two locations substantially diametrically opposite each other.

The one element can constitute the input element or the output element of the damper. In accordance with one of the presently preferred embodiments of the improved torsional vibration damping device, the one element has two substantially radially extending surfaces and the pockets are provided in one of these surfaces and are spaced apart from the other surface. The one surface is preferably provided with arcuate grooves extending between neighboring pockets. For example, the one surface can be provided with four equidistant pockets and with four arcuate grooves each of which extends along an arc of 90 degrees minus the length of a pocket (as measured in the circumferential direction of the one element). The other element is then provided with projections which extend into the grooves and engage the end portions of the adjacent energy storing components to cause such components to store energy in response to angular movement of the input and output elements relative to each other. The projections preferably extend substantially diametrically of the neighboring energy storing components and in parallelism with the axes of the input and output elements. The projections are provided on the output element if the pockets and grooves are provided in the input element, and vice versa.

In order to ensure reliable seating of the energy storing components in their pockets, the one element is preferably provided with pairs of facets, one pair in each of the pockets, and the facts of each pair are spaced apart from each other and extend from the one surface of the one element outwardly and away from the common axis of the two elements. The radially outermost portions of the pockets are preferably defined by undercut portions of the one element.

The other element of the damper can be made of or can contain a metallic material and can include (a) an annular portion and (b) projections provided on the annular portion and extending in parallelism with the axes of the input and output elements into the grooves in the one surface of the one element to engage the adjacent energy storing components, at least in response to angular displacement of the input and output elements relative to each other. The other element can be provided with one or more internal teeth mating with external teeth on a hub which is the output means of the improved torsional vibration damping device.

The improved torsional vibration damping device can further comprise two coaxial members which flank the damper and one of which is in frictional engagement with the one element, i.e., the one element can constitute a friction ring. One of the just mentioned members can constitute one of two substantially disc-shaped walls and the other member can constitute a flange-like output member of a second damper. The walls are spaced apart from one another in the axial direction of the input and output elements. These elements and the aforementioned energy storing components are disposed between the output member of the second damper and one of the walls, i.e., the wall which constitutes the one member. Means can be provided for clamping the one element between the output member of the second damper and the one wall. The other element is then disposed between the one element and the output member of the second damper. The output member and the other output element are preferably adjacent to but out of actual contact with one another. Means can be provided for non-rotatably connecting the one element with the output member of the second damper. The output member and the one element can define an annular chamber for the other element, and the one element preferably extends radially outwardly beyond the other element and abuts the output member radially outwardly of the other element. The means for non-rotatably connecting the one element with the output member of the second damper can comprise one or more projections provided on the one surface of the one element and extending into complementary sockets of the output member. The output element and the output member of the second damper are movable axially relative to each other, and the aforementioned clamping means can comprise means for biasing the one element and the output member axially toward each other. The biasing means can comprise a diaphragm spring or another suitable resilient element which is interposed between the output member and the other wall. The diaphragm spring is preferably installed in prestressed condition so that it reacts against the output member and bears against the other wall to thereby urge the one wall against the one element so that the one element is biased against the output member.

The one element can be provided with one or more ramps in each of its pockets to facilitate the introduction of energy storing components into the respective pockets. The ramps preferably extend all the way, or substantially all the way, between the pairs of abutments in the respective pockets.

One of the input and output elements can be disposed radially outwardly of the other of these elements so that the other element is at least partially surrounded by the one element. The arrangement may be such that the input element surrounds the output element. These elements can be disposed in a common plane which extends at right angles to the common axis of the two elements.

Each of the two elements can be provided with a set of pockets, and the pockets of the input element are complementary to and adjacent the pockets of the output element so that each energy storing component is received in one pocket of the input element and in the complementary pocket of the output element.

Another feature of the invention resides in the provision of a torsional vibration damping device, particularly for use in the clutch plate of a friction clutch between the output means (e.g., a crankshaft) of the internal combustion engine and the input means (e.g., a shaft) of the change-speed transmission in a motor vehicle. The damping device comprises a hub which is connectable with or forms part of the input element of the change-speed transmission and has external teeth (the term "teeth" is intended to embrace ribs, keys or analogous torque-transmitting profiles), and coaxial series-connected first and second dampers between the output element of the engine and the hub. The first damper comprises a first input element which is rotatable on the hub, a first output element which is non-rotatably secured to the hub and at least one energy storing member interposed between and serving to yieldably oppose rotation of the two elements relative to each other with a first force. The second damper comprises a second input element, a second output element having internal teeth mating with the external teeth of the hub with a predetermined amount of plate, and at least one second energy storing member interposed between and serving to oppose rotation of the second elements relative to each other with a second force exceeding the first force. In accordance with a feature of the invention, at least one element of the first damper contains or is made of a synthetic material. For example, the first output element can be made of a synthetic material, and such element has one or more windows registering with the windows of the first input element to receive the first energy storing member or members, e.g., one or more coil springs. The entire hub, or at least the external teeth of such hub, can be made of a suitable metallic material.

The first input element preferably comprises two spaced-apart metallic discs and rivets or other suitable fastener means for non-rotatably coupling the discs to each other. The first output element can comprise or constitute a synthetic flange which is disposed between the two discs. Such flange can be made with internal teeth mating with external teeth of the hub to thus hold the flange against rotation relative to the hub. To this end, the internal teeth of the flange mate, without play, with the external teeth of the hub. The hub can be provided with internal teeth which mate with the external teeth of the input shaft of the change-speed transmission.

The external teeth of the hub can include a first section mating with the internal teeth of the second output element (with the aforementioned angular play) and a second section whose teeth mate (without play) with the internal teeth of the flange which forms part of or constitutes the output element of the first damper. The teeth of the first section are preferably longer (as considered in the radial direction of the hub) than the teeth of the second section. The hub can be formed with at least one radial shoulder between the two sections of its external teeth, and the one first element (e.g., the flange which constitutes or forms part of the output element of the first damper) preferably abuts against such shoulder. The external teeth of the hub can include a third section which is disposed between the first and second sections (as considered in the axial direction of the hub) and whose teeth are shorter than the teeth of the first section but longer than the teeth of the second section.

The second input element preferably comprises a disc which constitutes one of the two discs of the first input element. Friction linings (which transmit torque from the output means of the engine) are provided on that disc which is common to the first and second input elements. The common disc is preferably disposed between the first and second output elements, and the damping device preferably further comprises a spring (e.g., a stressed diaphragm spring) which is disposed between the common disc and the second output element to bias such parts axially of the hub and away from each other. The radially outer portion of the spring preferably bears against the second output element and the radially inner portion of the spring preferably reacts against the common disc. The flange of the first damper is disposed between the two discs of the first input element and preferably constitutes the one (synthetic) element of the first damper.

A stressed undulate spring or a stressed diaphragm spring can be mounted to react against the hub and to bear against the input element of the second damper; such input element is preferably connected with the first input element in such a way that it biases a preferably disc-shaped part of the second input element axially of the hub and away from the second output element. The spring preferably reacts directly against the external teeth of the hub. A friction lining can be interposed between the input and output elements of the second damper, and such friction lining is clamped by the spring between the respective input and output elements. Moreover, the spring can be mounted in such a way that it biases the input and output elements of the first damper axially of the hub and against each other to thus bias the output element of the first damper against the aforementioned radial shoulder of the hub.

In accordance with a presently preferred design of the improved clutch plate, the first input element comprises two coaxial discs and rivets or like means for non-rotatably coupling the discs to each other. The first output element is or comprises a first flange which is disposed between the two discs and whose internal teeth mate with the adjacent section of external teeth on the hub so as to prevent the hub and the first output element from rotating relative to each other. The first output element is made of a suitable synthetic material and has one or more windows registering with windows in the discs to receive coil springs or like first energy storing members. One of the discs carries a friction lining which transmits torque when the clutch is engaged, i.e., when the clutch transmits torque between the crankshaft of an engine and the input shaft of a change-speed transmission. The one disc forms part of the second input element which latter further comprises an additional disc, and the output element of the second damper is a second flange which is received between the discs of the second input element and has internal teeth mating (with a certain amount of play) with the corresponding section of external teeth on the hub. The flange of the second output element has one or more windows registering with the windows of discs forming part of the second input element to receive coil springs or like springs forming part of the second energy storing member. Rivets or other suitable fastener means are provided to non-rotatably couple the discs of the second input element to each other. A spring and a friction ring are disposed between the flange of the second output element and the second input element.

A further feature of the invention resides in the provision of a torque transmitting device, particularly in a clutch plate which can be used in the friction clutch of a motor vehicle. More particularly, this further feature of the invention resides in the provision of a torque transmitting assembly which can form part of or which can constitute the torque transmitting device and comprises an input component (comprising two axially spaced-apart coaxial discs) and a substantially hub-shaped output component which is surrounded by the input component, a first torsion damping stage having coaxial input and output elements which are rotatable relative to each other within first limits and first energy storing means interposed between the input and output elements to oppose their rotation relative to each other with a first force, and a second torsion damping stage having an input member, a preferably flange-like output member which is coaxial with and is rotatable relative to the input member within second limits, and second energy storing means interposed between the input and output members to oppose their rotation relative to each other with a (preferably greater) second force. The output member of the second damping stage is coaxially mounted on the output component with an angular play, the discs of the input component flank the output member, and the first stage is interposed between the output member and one of the discs. The output component is preferably provided with internal teeth so that it can transmit torque to the input shaft of a change-speed transmission in a motor vehicle if the improved assembly forms part of or constitutes a clutch plate in the friction clutch of an automobile or the like. The output element of the first stage is preferably coaxial with and is preferably non-rotatably secured to the output component of the torsion damping assembly. The play between the external teeth of the output component and the internal teeth of the output member is preferably within the aforementioned first limits.

The input element preferably comprises two spaced-apart coaxial discs (hereinafter called plates to distinguish them from the discs of the input component) which are secured to the output member and have registering windows for portions (e.g., discrete coil springs) of the first energy storing means. The output element of the first stage can comprise or constitute a flange which is non-rotatably secured to the output component and has additional windows for portions of the first energy storing means. The flange is disposed between the plates of the input element. One of these plates can abut directly against the output member of the second damping stage. Form-locking means can be provided for non-rotatably connecting the plates of the input element to the output member; such form-locking means can comprise projections (e.g., in the form of lugs or pins or studs) which are provided on the other plate and extend substantially axially of the torque transmitting device into holes, bores, cutouts or otherwise configurated recesses which are provided therefor in the output member. The projections are preferably formed with tips which taper in a direction axially of the torque transmitting device and away from the other plate, and with shoulders which serve to urge the one plate against the output member. The one plate is preferably provided with cutouts through which the tips of the projections on the other plate extend toward and into the respective recesses of the output member. The shoulders then abut against the one plate to thereby maintain the two plates at a fixed axial distance from each other while simultaneously urging the one plate against the output member. The width of the tips can decrease in a direction axially of the components and away from the other plate. Means can be provided for biasing the one plate against the output member; such biasing means can react against the input member and can bear against the other plate to thereby urge the one plate against the output member. The input member of the second damping stage can comprise two axially spaced-apart coaxial discs, and the biasing means can comprise a prestressed spring (e.g., an undulate spring) which reacts against one of the discs forming part of the input member. The other disc of the input component can be provided with a convex or substantially convex surface which is in direct fictional engagement with the output member of the second damping stage. For example, such other disc can have one or more substantially annular corrugations, and the convex surface or surfaces can be provided on such corrugation or corrugations. The convex surface or surfaces are preferably closely adjacent to the common axis of the input and output components, i.e., to the axis of the aforementioned hub-shaped output component. The input component can include or constitute the input member of the second damping stage.

The one disc of the input component can carry a set of friction linings if the torque transmitting device is the clutch plate of a friction clutch.

The second damping stage can further comprise a friction generating ring having an annular portion which is surrounded by one disc of the input component and surrounds the output component, and a radially extending second portion which is adjacent to one side of the respective disc.

The output element of the first damping stage can constitute a flange which is axially clamped between a set of external teeth on the hub-shaped output component and an external upset portion of the output component.

At least one element of the first damping stage can contain or consist of a synthetic plastic material. For example, the input element of the first damping stage can be made of a fiber-reinforced synthetic plastic material and can be designed to transmit to the output component moments which develop under the action of the springs of the first energy storing means. Such springs are preferably accommodated in circumferentially extending windows of the input element and react against the input element, e.g., by further extending into windows which are provided therefor in the preferably flange-like output element of the first damping stage. The internal teeth of the plastic output element can mate directly with the external teeth of the output component.

The novel features which are considered as characteristic of the invention are set forth in particular in the appended claims. The improved torsional vibration damping device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
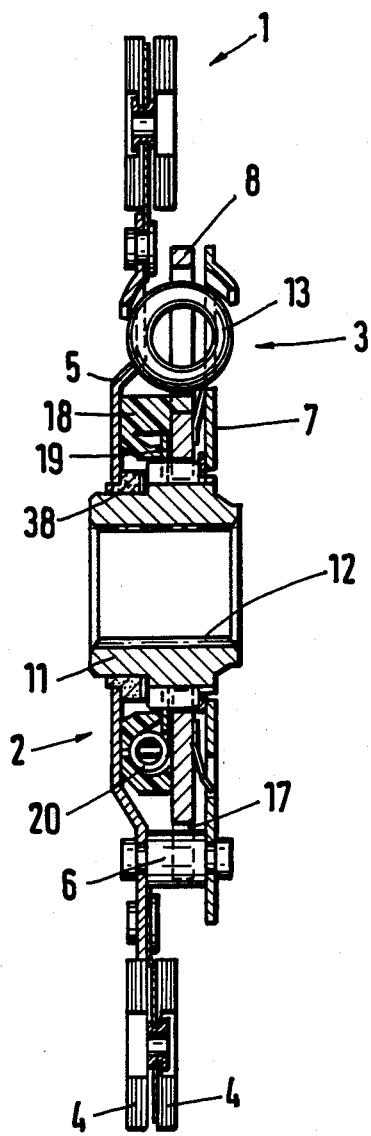
FIG. 1 is an axial sectional view of a clutch plate which embodies one form of the improved torsional vibration damping device.
Figure 2:
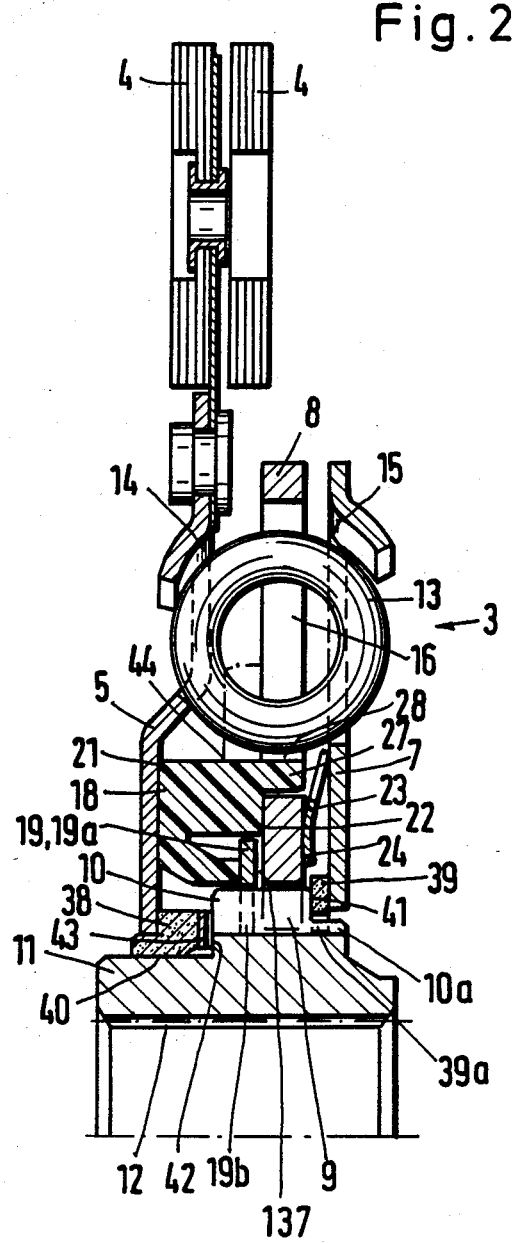
FIG. 2 is an enlarged view of the upper half of the clutch plate which is shown in FIG. 1.
Figure 3:
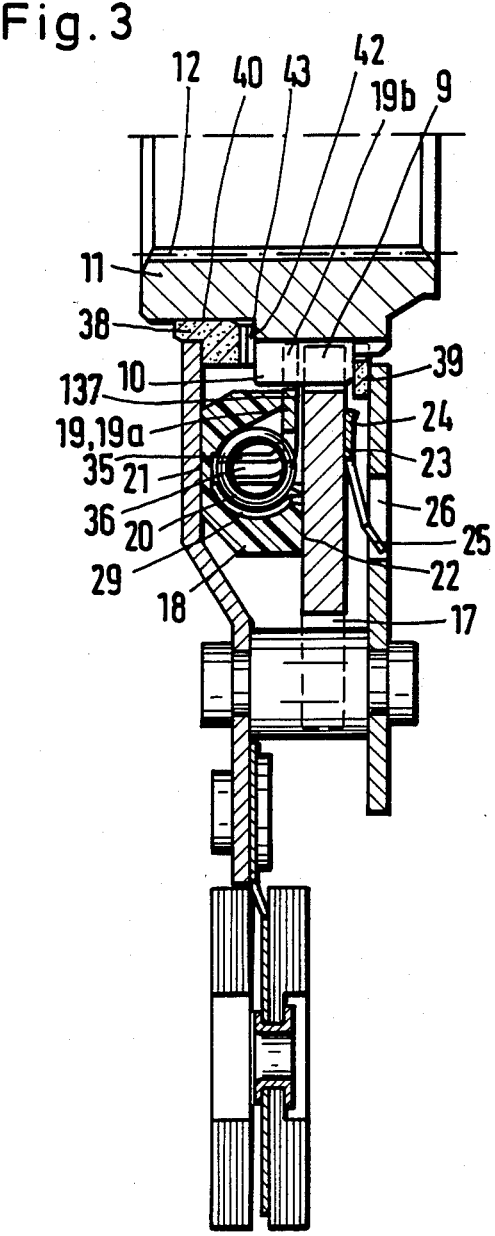
FIG. 3 is an enlarged view of the lower half of the clutch plate which is shown in FIG. 1.

Referring first to FIGS. 1 to 3, there is shown a clutch plate or clutch disc 1 which embodies one form of the improved torsional vibration damping device and can be used as an element in a friction clutch in the power train between a crankshaft which is driven by the internal combustion engine and the input shaft of the change-speed transmission of a motor vehicle. Reference may be had to numerous granted United States Letters Patent and pending United States patent applications of the assignee.

The torsional vibration damping device of the clutch plate 1 comprises a first damper 2 and a second or main damper 3. A feature of the invention resides in the construction of the damper 2 and in the manner in which the damper 2 cooperates with the second damper 3 as well as with other parts of the clutch plate 1. The input member of the clutch plate 1 and of the second damper 3 includes a first disc-shaped wall 5 which carries a set of friction linings 4, and a second disc-shaped wall 7 which is spaced apart from the wall 5 in the direction of the common axis of the dampers 2, 3 and is non-rotatably secured to the wall 5 by a set of distancing elements in the form of rivets 6. The output member of the second damper 3 is a flange 8 which is disposed between the walls 5, 7 and has an annulus of internal teeth 9 mating with the external teeth 10 of a hub 11 which constitutes the output means of the clutch plate 1. The friction linings 4 can be clamped between the pressure plate of the friction clutch and a flywheel on the crankshaft of the engine, and the hub 11 has internal teeth 12 which can mate with complementary external teeth on the input shaft of the change-speed transmission. The clutch plate 1 transmits torque between the flywheel and the input shaft of the change-speed transmission when the friction clutch is engaged, i.e., when the pressure plate urges the friction linings 4 against the flywheel.

The internal teeth 9 of the flange 8 engage the external teeth 10 of the hub 11 with a certain lay which determines the range of operativeness of the first damper 2.

The second damper 3 comprises a set of energy storing components in the form of relatively rigid coil springs 13 each of which extends into a window 14 of the wall 5, into a window 15 of the wall 7 and into a window 16 of the flange 8. The coil springs 13 oppose angular movements of the input member including the walls 5, 7 relative to the output member including the flange 8 of the second damper 3, or vice versa. The extent to which the input and output members 5, 7 and 8 of the second damper 3 can turn relative to each other is determined by the distancing elements 6 and the surfaces bounding the ends of circumferentially extending cutouts or recesses 17 in the peripheral surface of the flange 8. As can be seen in FIG. 3, the shank of each distancing element 6 extends into and across a discrete recess 17.

The first damper 2 is installed in the space between the wall 5 and the flange 8. The input element 18 of the damper 2 is a disc which is made of a suitable synthetic material, such as polytetrafluoroethylene. The synthetic material can be reinforced by filaments or the like. The output element 19 of the first damper 2 is made of sheet metal and is disposed between the input element 18 and the flange 8. The output element 19 is held against rotation relative to the hub 11; to this end, the output element 19 has a set of internal teeth 19b mating, without play, with the external teeth 10 of the hub 11. The elements 18 and 19 have limited freedom of angular movement relative to each other against the opposition of energy storing components in the form of coil springs 20 which are softer than the coil springs 13 of the second damper 3 and extend substantially tangentially of the elements 18, 19. The extent to which the elements 18, 19 can turn relative to each other is determined by the play between the internal teeth 9 of the flange 8 and the external teeth 10 of the hub 11.

The disc-shaped or ring-like input element 18 of the damper 2 has two substantially parallel radially extending surfaces 21, 22. The surface 21 abuts the adjacent side of the wall 5 under the action of a resilient element 23 which reacts against the flange 8 and bears against the wall 7 to thereby pull the wall 5 in a direction to the right, as seen in FIGS. 1 to 3. The resilient element 23 is a diaphragm spring which is installed in prestressed condition so that the input element 18 of the damper 2 is clamped between the wall 5 and the flange 8. The radially innermost portion of the diaphragm spring 23 is rounded (at 24) and abuts the flange 8. The radially outermost portion of the spring 23 is constituted by an annulus of radially outwardly extending fingers or prongs 25 which are received in openings 26 of the wall 7 so as to ensure that the input member including the walls 5, 7 and the distancing elements 6 cannot rotate relative to the diaphragm spring 23 and vice versa.

The input element 18 of the damper 2 is held against rotation relative to the flange 8. To this end, the surface 22 of the input element 18 is provided with one or more plug-shaped projections 27 extending into complementary sockets 28 of the flange 8. The projections 27 simultaneously serve as a means for centering the input element 18 with reference to the flange 8.

Figure 4:
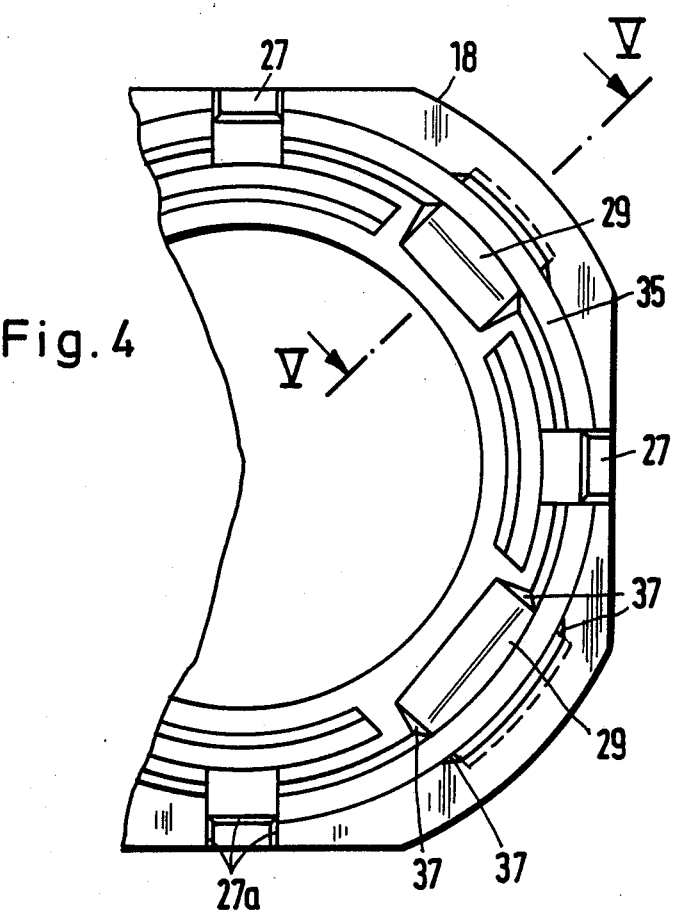
FIG. 4 is a fragmentary front elevational view of the synthetic element of the first damper in the clutch plate of FIGS. 1 to 3.

In accordance with a feature of the invention, the energy storing components 20 are partially confined in elongated circumferentially extending pockets 29 which are provided in the surface 22 of the input element 18. As can be seen in FIG. 4, the input element 18 has four equidistant pockets 29 each of which receives a discrete energy storing component 20. A properly inserted component 20 extends substantially tangentially of the elements 18 and 19. The pockets 29 include a pair of relatively long pockets and a pair of relatively short pockets. The shorter and longer pockets alternate in the circumferential direction of the input element 18. The longer pockets 29 receive longer energy storing components 20, and the energy storing components in the shorter pockets are shorter; this enables the damper 2 to exhibit a two-stage characteristic curve. The longer pockets 29 are disposed diametrically opposite each other, the same as the shorter pockets.

As can be seen in FIGS. 1 and 3, the input element 18 of the damper 2 surrounds each energy storing component (coil spring) 20 along an arc of at least 180 degrees, as considered in the circumferential direction of the energy storing components. The depth of the pockets 29 does not match the distance between the neighboring portions of the surfaces 21, 22, i.e., the pockets 29 do not extend all the way to the surface 21; nevertheless, the depth of the pockets 29 suffices to ensure that each energy storing component 20 is at least substantially confined in the respective pocket.

Figure 5:
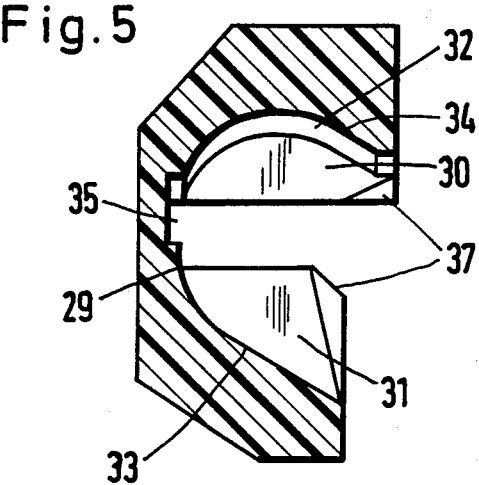
FIG. 5 is an enlarged fragmentary sectional view as seen in the direction of arrows from the line V—V of FIG. 4.

The end faces 30, 31 (see FIG. 5) in the pockets 29 constitute abutments for the respective end portions (outermost convolutions) of the energy storing components 20. FIG. 5 shows that the area of each abutment 30, 31 is large so as to establish a large-area contact with the respective end portion of the energy storing component 20. This is desirable and advantageous because the energy storing components 20 are acted upon by uniformly distributed stresses and are less likely to buckle.

FIGS. 3 and 5 show that each pocket 29 extends from the surface 22 and outwardly, i.e., away from the common axis of the elements 18, 19. The central portions of the pockets 29 are formed by undercut portions 32 of the input element 18 which also contributes to more reliable retention of energy storing components 20 between the elements 18 and 19. More specifically, the undercuts 32 reduce the likelihood of unintentional or accidental axial shifting of the energy storing components 20 in the input element 18. For the same purpose, the input element 18 is formed with pairs of inclined facets 33, 34 (note FIG. 5) which are spaced apart from each other and bound portions of the respective pockets 29 adjacent the surface 22. The facets 33, 34 make oblique angles with the surface 22.

The input element 18 is further provided with four arcuate grooves 35 (FIGS. 4 and 5) which are machined into or are otherwise formed in the surface 22 and each of which connects two neighboring pockets 29. The depth of the grooves 35 (at right angles to the surface 22) at least matches but can exceed the diameter of an energy storing component 20.

The output element 19 of the damper 2 is confined in a pocket between the flange 8 and the input element 18. The element 19 has a washer-like circumferentially complete portion 19a which surrounds the hub 11, and projections or arms 36 which are parallel to the common axis of the elements 18, 19 and extend into the adjacent grooves 35. The projections 36 can constitute suitably bent outermost parts of the washer-like portion 19a. The distribution of the projections 36 is such that they are caused to bear against the adjacent end portions of the energy storing elements 20 when the input element 18 is caused to turn relative to the output element 19 and/or vice versa in a direction to cause the components 20 to store energy. The arrangement may be such that each projection 36 abuts the adjacent end portion of an energy storing component 20 in the neutral positions of the elements 18, 19 and the component 20 is compressed regardless of whether the element 18 or 19 is turned clockwise or counterclockwise while the element 19 or 18 is held against rotation or rotates counterclockwise or clockwise. In order to ensure uniform compression of the energy storing components 20, each of the projections 36 extends diametrically across the entire end portion of the associated component 20.

The aforementioned internal teeth 19b are provided at the radially innermost end of the washer-like portion 19a and mate with the external teeth 10 of the hub 11 so as to hold the output element 19 and the hub 11 against rotation relative to each other but to allow such parts to move axially with reference to one another.

In order to prevent the development of excessive frictional forces when the input element 18 (which is non-rotatably coupled to the flange 8) and the output element 19 (which is non-rotatably coupled to the hub 11) are caused to turn relative to each other, the aforementioned chamber which is defined for the output element 19 by the synthetic input element 18 and the flange 8 is dimensioned in such a way that the output element 19 does not actually contact the flange 8 (note the narrow clearance 137 shown in FIG. 3). The chamber is an annular chamber and the input element 18 extends radially outwardly beyond the output element 19 to have its surface 22 abut the flange 8 radially outwardly of the element 19. Thus, the output element 19 of the damper 2 is encapsulated between the hub 11, flange 8 and input element 18.

In order to simplify the assembly of the clutch plate 1, and particularly the insertion of energy storing components 20 into the respective pockets 29, the input element 18 is formed with a pair of suitably inclined ramps 37 in each of the pockets 29. Each of the ramps 37 extends substantially tangentially of the output element 19 and preferably all the way between the respective abutments 30, 31. The ramps 37 impart to the corresponding portions of the input element 18 the shape of funnels which is conducive to predictable introduction of energy storing components 20 into the pockets 29 in such a way that the end portions of a properly inserted component 20 are adjacent the respective abutments 30, 31.

The assembly of the clutch plate 1 can be simplified still further by configuring the aforementioned projections 27 of the input element 18 in such a way that each of these projections can be readily introduced into the corresponding socket 28 of the flange 8. As shown in FIG. 4, the free end portions 27a of the projections 27 resemble wedges which can readily enter the adjacent sockets 28 to thus hold the input element 18 and the flange 8 against rotation relative to each other as well as to properly center the element 18 relative to the damper 3 (including the flange 8, the walls 5, 7, the distancing elements 6 and the energy storing components 13).

The radially innermost portion of the wall 5 for the friction linings 4 surrounds the axially extending portion of a friction ring 38 having an L-shaped cross-sectional outline (see FIG. 2). The friction ring 38 surrounds a cylindrical peripheral surface 40 of the hub 11 at one axial end of the set of external teeth 10. The radially outwardly extending portion of the friction ring 38 is adjacent the inner side of the wall 5 and is biased against this wall by an undulate annular spring 43 which reacts against an external radial shoulder 42 of the hub 11 and bears against the right-hand end face of the friction ring 38. The spring 43 urges the wall 5 axially in a direction to the left (as seen in FIG. 2) to thereby clamp a friction ring 39 between the inner side of the wall 7 and the adjacent end faces 41 of external teeth 10 on the hub 11. The friction ring 39 has internal teeth 39a mating with the adjacent shorter portions 10a of external teeth 10 on the hub 11.

If the input means 5–7 of the clutch plate 1 is caused to leave its neutral position relative to the output means 11 (or vice versa), the projections 36 cause the adjacent energy storing components 20 of the first damper 2 to store energy because the output element 19 is held against rotation relative to the hub 11 and the input element 18 is held against rotation relative to the flange 8 which, at such time, shares the angular movements of the walls 5, 7. The friction rings 38 and 39 respectively oppose rotation of the walls 5, 7 relative to the hub 11.

When the angular displacement of the walls 5, 7, energy storing components 13 and flange 8 relative to the hub 11 reaches that value which is necessary to eliminate the play between the internal teeth 9 of the flange 8 and the external teeth 10 of the hub 11, the first damper 2 becomes ineffective and any further angular displacement of the walls 5, 7 relative to the hub 11 entails a rotation of such walls relative to the flange 8 against the opposition of the relatively strong energy storing components 13 of the second damper 3. The damping action of the parts 5–8, 13 is assisted by friction which is generated by the rings 38, 39, by pronounced friction between the diaphragm spring 23 and the flange 8, and by friction between the input element 18 and the wall 5.

The axially extending projections 27 of the input element 18 and the corresponding sockets 28 of the flange 8 can be replaced with radially outwardly extending prongs 44 one of which is shown in FIG. 2 by phantom lines and which engage the end portions of the energy storing components 13 of the main damper 3. As mentioned above, the energy storing components 13 can constitute coil springs whose stiffness considerably exceeds that of the energy storing components 20 of the damper 2.

The metallic output element 19 of the damper 2 can be replaced with a synthetic output element. The dimensions of a synthetic output element will be determined by the stability of its material.

As can be seen in FIGS. 1 to 3, the entire damper 2 can be installed radially inwardly of the set of energy storing components 13 of the damper 3.

The improved torsional vibration damping device and its dampers are simple, compact and inexpensive. Thus, the first damper 2 merely comprises a set of energy storing components 20, a rather simple output element 19 and a relatively simple and inexpensive but versatile input element 18. The provision of pockets 29 and various ramps 37, abutments 30, 31, facets 33, 34 and other features in the pockets 29 allows for rapid, predictable and inexpensive assembly of the parts of the damper 2 and for retention of its parts in optimum positions relative to each other. The synthetic element or elements of the damper 2 can be mass-produced in available injection molding, extruding or other suitable machines at an extremely low cost. As mentioned above, the synthetic material can be reinforced by fibers and/or in any other way so as to ensure that the element or elements which are made of synthetic material will exhibit a required stability, resistance to wear and other desirable characteristics without the need for an undue increase of their bulk and weight. An important advantage of elements which are made of a synthetic material is that they can readily conform to the shape of the space which is available in the torsional vibration damping devices of clutch plates and the like.

The configuration of surfaces bounding the pockets 29 can be readily selected in such a way that the major part of each confined energy storing component 20 is surrounded by the respective element (i.e., by the input element 18 if the pockets 29 are provided only in the input element, by the output element 19 if the pockets are provided solely in the output element, and by the elements 18, 19 jointly if the pockets are provided in part in the element 18 an in part in the element 19). It has been found that the energy storing components 20 can be readily introduced into their pockets even if they are surrounded by the material around the pockets along arcs of at least or, if desired, well in excess of 180 degrees (as measured in the circumferential direction of the energy storing components). As can be readily seen in FIGS. 1 and 3, the configuration of the surfaces bounding the pockets 29 is preferably selected in such a way that the radially outermost portions of the energy storing components 20 are completely or practically completely surrounded by the material of the element (18) which is provided with pockets. This ensures that the energy storing components 20 are adequately held against any undesirable movements in the radial direction of the clutch plate. FIGS. 1 and 3 further show that the input element 18 can engage each energy storing component 20 at two locations which are disposed diametrically opposite each other (with reference to the axis of the energy storing component). The same applies for the configuration and dimensioning of the abutments 30 and 31; each of these abutments can engage the adjacent end convolution of the corresponding energy storing component 20 at several points including at least one pair of points which are disposed diametrically opposite each other.

The damper 2 of FIGS. 1 to 5 can be modified by providing it with a synthetic output element in addition to (see FIG. 6) or in lieu of the synthetic input element 18. It is further within the purview of the invention to install the energy storing components 20 or analogous energy storing components in a synthetic output element and to provide the projections 36 on the input element.

The undercut portions 32 of the input element 18 ensure highly reliable retention of energy storing components 20 against uncontrolled and undesirable movements in the axial direction of the clutch plate 1.

The feature that the synthetic element of the damper 2 constitutes a friction ring contributes to simplicity and lower cost of the improved damper 2 and of the torsional vibration damping device.

The structure which is shown in FIGS. 1 to 5 exhibits the additional advantage that the entire damper 2 can be installed in the space (between the wall 5 and the flange 8) which is available in many types of clutch plates. Moreover, and since the energy storing components 20 of the damper 2 are axially offset with reference to the energy storing components 13 of the damper 3, the two sets of energy storing components can be mounted close or very close to each other (as considered in the radial direction of the clutch plate). This contributes significantly to compactness of the torsional vibration damping device and of the entire clutch plate.

Encapsulation of the output element 19 between the input element 18 and the flange 8, and the installation of energy storing components 20 in the pockets 29 at that side of the input element 18 which faces the flange 8 reduces the likelihood of contamination of the components 20 and/or of the output element 19.

The compactness of the damper 2, and hence of the entire torsional vibration damping device, is enhanced because the output element 19 is located within the confines of the input element 18, i.e., the output element 19 need not extend axially beyond the surface 22 or, otherwise stated, the output element 19 is coplanar with the input element 18. Such arrangement reduces the space requirements of the damper 2 in the axial direction of the clutch plate 1.

Figure 6:
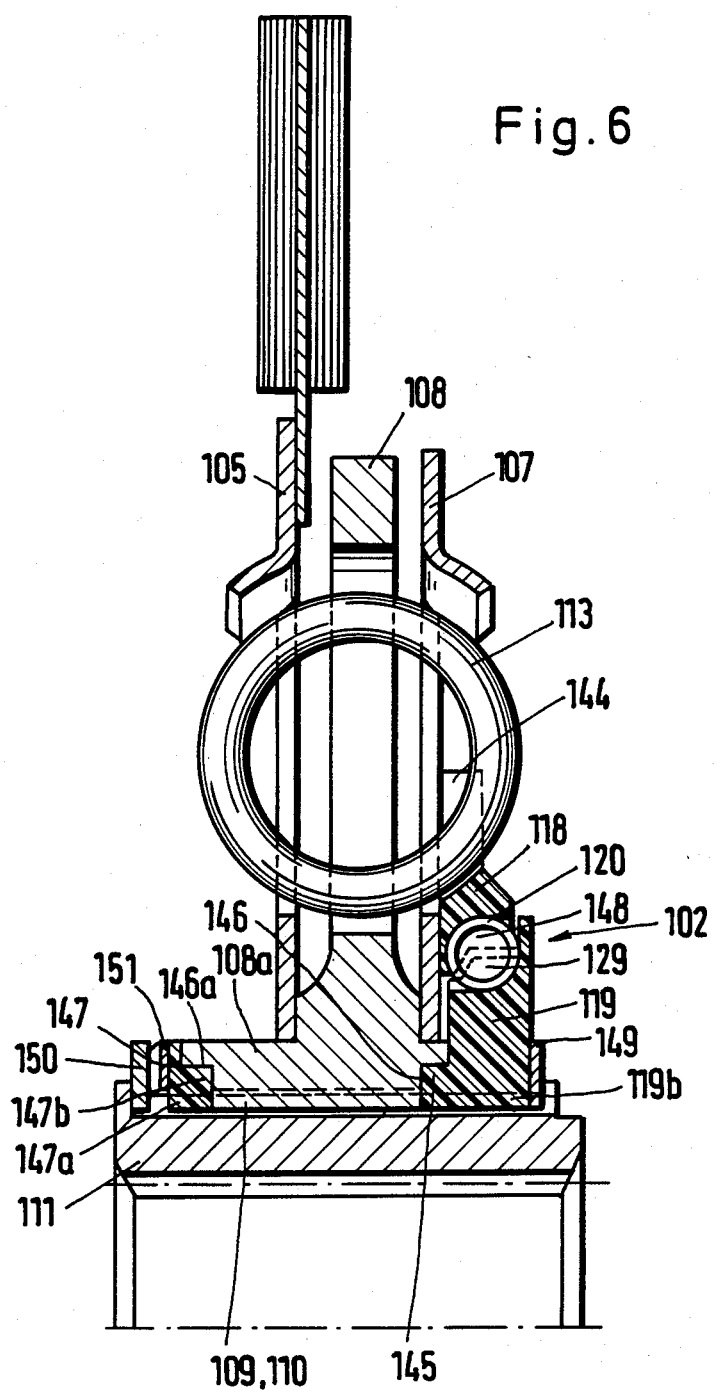
FIG. 6 is a fragmentary axial sectional view of a clutch plate which embodies a modified torsion vibration damping device.

FIG. 6 shows a portion of a clutch plate or clutch disc which embodies a modified torsional vibration damping device. One of the differences between the devices of FIGS. 1–5 and FIG. 6 is that the first damper 102 of the torsional vibration damping device of FIG. 6 is not mounted between the walls 105, 107 but rather at the outer side of the wall 107. The flange 108 of the main damper includes an enlarged hub-like radially innermost portion 108a having internal teeth 109 in mesh with the external teeth 110 of the hub 111. The play between the teeth 109 and 110 determines the range of the damper 102. The walls 105 and 107 surround the enlarged portion 108a of the flange 108 and are disposed at the opposite sides of the flange.

The damper 102 comprises a synthetic input element 118 and a synthetic output element 119. The output element 119 has internal teeth 119b which mate with the external teeth 110 so that the output element 119 and the hub 111 cannot rotate relative to each other. A ring-shaped annular extension 145 of the output element 119 is disposed radially inwardly of the wall 107 and extends into a complementary recess 146 of the enlarged portion 108a of the flange 108. The dimensions of the surfaces bounding the extension 145 and the recess 146 are selected in such a way that the flange 108 and its enlarged portion 108a are centered on the extension 145 of the output element 119.

That axial end of the enlarged portion 108a which is remote from the extension 145 is adjacent a sleeve 147 having an L-shaped cross-sectional outline and including an axially extending portion 147b in a recess 146a of the enlarged portion 108a. The sleeve 147 has internal teeth 147a in mesh with the external teeth 110 of the hub 111. The surfaces bounding the axially extending portion 147b and the recess 146a are dimensioned in such a way that the axially extending portion 147b constitutes a bearing and a centering means for the enlarged portion 108a of the flange 108 i.e., the flange 108 surrounds the hub 111 without any or without appreciable radial play.

The energy storing components 120 of the damper 102 are received, in part, in circumferentially extending pockets 129 of the output element 119. The input element 118 is formed with complementary pockets 148, one for each of the pockets 129, and the mounting of each energy storing component 120 is such that it is confined in the composite pocket including one of the pockets 129 and the adjacent complementary pocket 148. The pockets 129 extend radially inwardly from the outer peripheral surface of the output element 119, and the pockets 148 are provided in one of two radially extending surfaces of the input element 118. The dimensions of the pockets 129, 148 are selected in such a way that the energy storing components 120 are practically completely confined therein and cannot accidentally leave the respective pairs of pockets when the damper 102 is in actual use. As can be seen in FIG. 6, the input element 118 can actually abut or can be immediately adjacent the illustrated energy storing component 120 from the eight o'clock to the twelve or one o'clock position, ad the output element 119 can extend along the same energy storing component 120 from the two or three o'clock to the six or seven o'clock position. The output element 119 has abutments in each of the pockets 129 for the end portions of the respective energy storing component 120, and the input element 118 has abutments in each of the pockets 148 for the end portions of the respective component 120. The configuration of the pockets 129, 148 is such that the energy storing components 120 are properly held against uncontrolled or undesirable movement in the axial, radial and circumferential direction of the elements 118, 119.

The input element 118 has radially outwardly extending arms 144 which are adjacent the end portions of the energy storing components 113 of the main damper. The energy storing components 113 can constitute coil springs which are stronger than the energy storing components 120 of the damper 102. The arms 144 ensure that the two dampers are operated in an optimum sequence. Thus, the relatively stiff energy storing components 113 of the main damper can move the input element 118 relative to the output element 119 at least during a certain stage of angular movability of the elements 118, 119 relative to each other.

The flange 108 is held against axial movement along the hub 111 by two retaining rings 149, 150 which are flanked by external collars at the axial ends of the hub 111. An undulate annular spring 151 is disposed between the retaining ring 150 and the sleeve 147 so as to urge the sleeve 147 and hence the hub-like enlarged portion 108a of the flange 108 toward the retaining ring 149. This ensures that the sleeve 147, the enlarged portion 108a and the output element 119 are held in predetermined axial positions.

In the embodiment of FIG. 6, the thickness of the input element 118 equals or approximates the thickness of the output element 119 (as measured in the axial direction of the hub 111), and the two elements are disposed in a common plane extending at right angles to the axis of the hub 111.

The torsional vibration damping devices of FIGS. 1–5 and 6 are susceptible of many additional modifications. For example, the output member of the main damper can comprise two discs which flank a disc-shaped carrier of friction linings (such carrier then constitutes the output member of the main damper). The discs of the output member can be rigidly secured to a hub having internal teeth meshing, with a certain amount of play, with the external teeth of an inner hub. The inner hub is non-rotatably mounted on the input shaft of a change-speed transmission.

Figure 7:
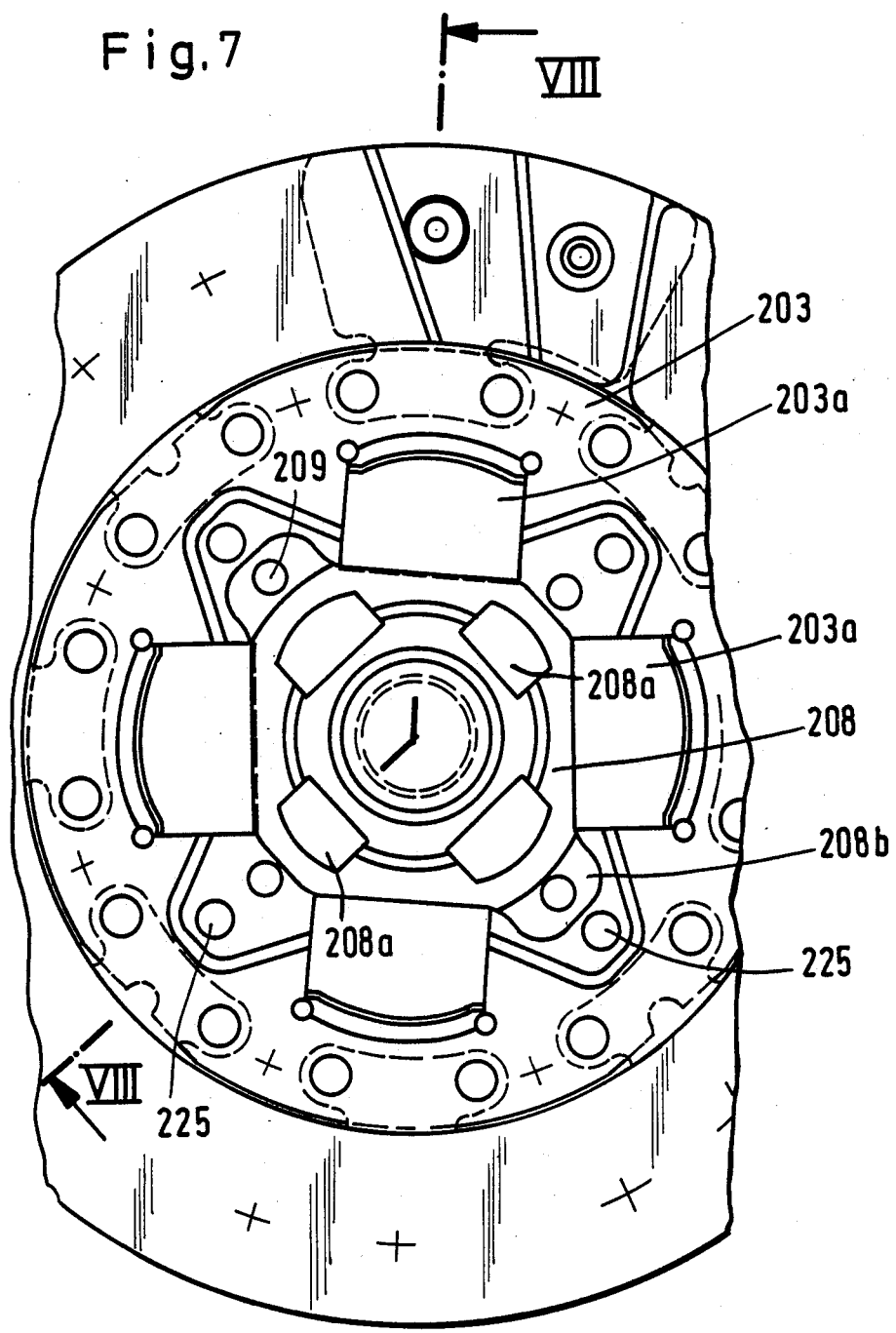
FIG. 7 is a fragmentary elevational view of a third clutch plate.
Figure 8:
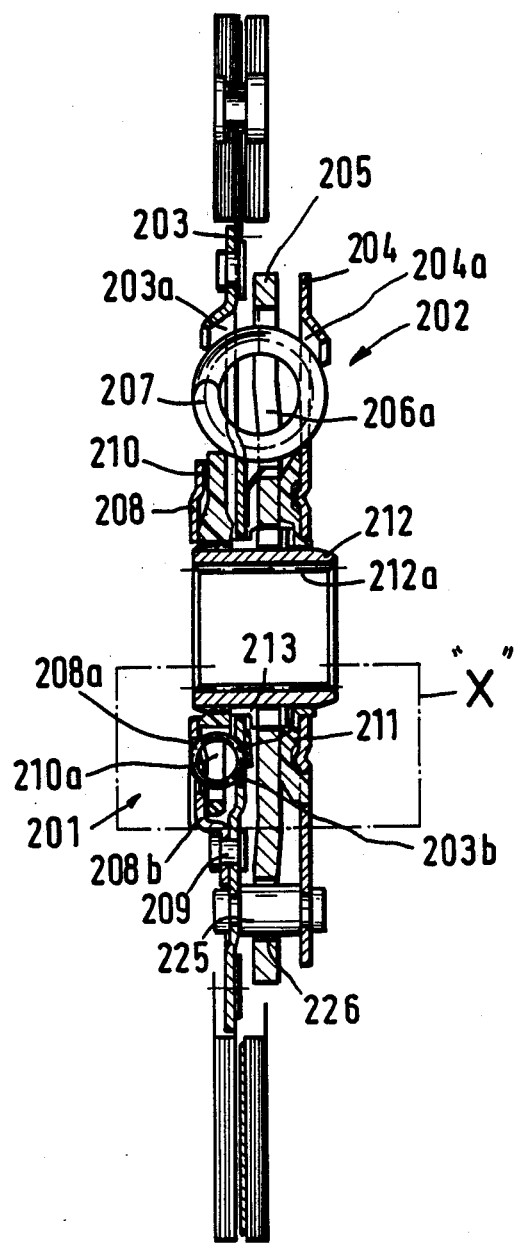
FIG. 8 is a sectional view as seen in the direction of arrows from the line VIII—VIII of FIG. 7.
Figure 9:
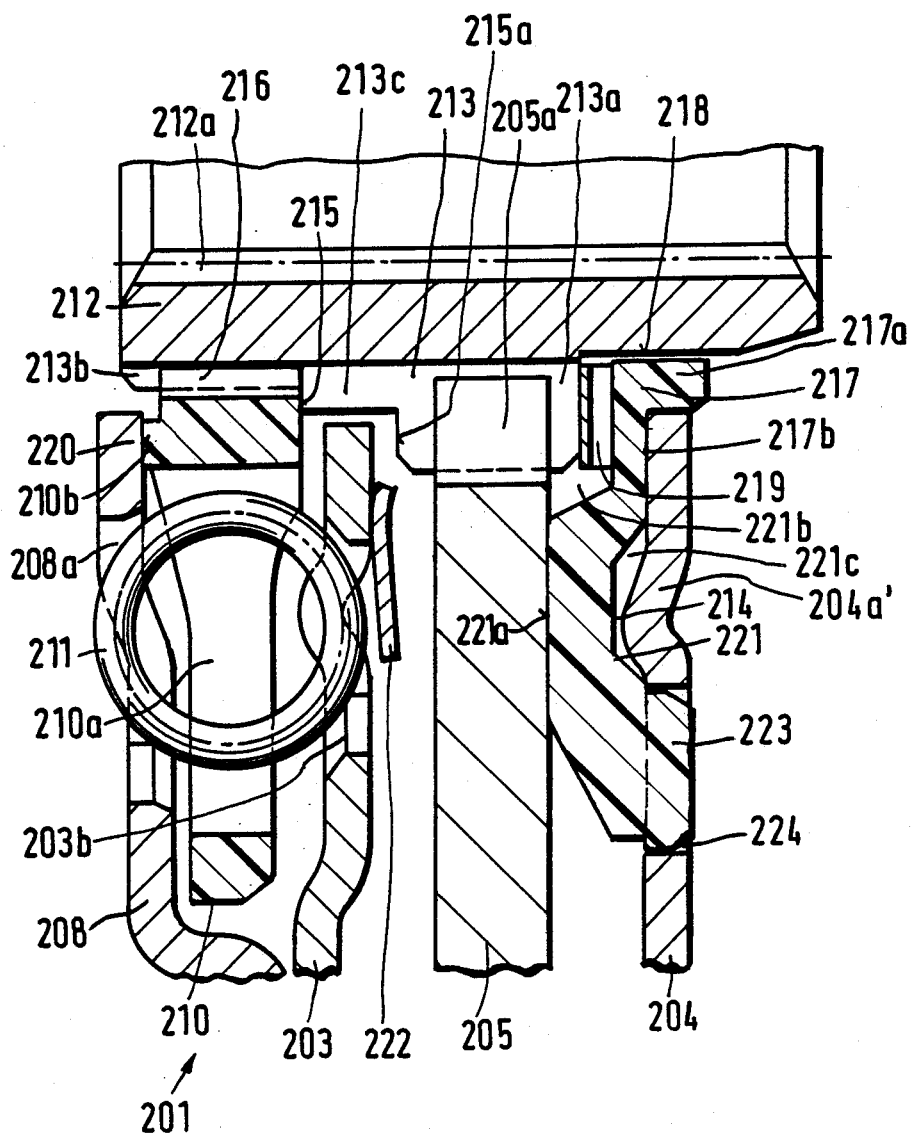
FIG. 9 is an enlarged view of a detail within the phantom-line rectangle "X" in FIG. 8.

The clutch plate which is shown in FIGS. 7 to 9 comprises a damping device including a primary or first damper 201 and a secondary or main damper 202. The input element of the main damper 202 comprises a first disc 203 which carries friction linings (unnumbered) and a second disc 204, and the output element of the main damper 202 comprises a flange 205 which can turn relative to the discs 203, 204 against the opposition of energy storing elements in the form of coil springs 207. Such springs are installed in registering windows 203a, 204a and 206a which are respectively provided in the discs 203, 204 and flange 205.

The disc 203 further constitutes one part of the input element of the first damper 201, and the other part of such input element is constituted by a disc- or plate-like member 208 which is non-rotatably affixed to the disc 203 by means of rivets 209 or analogous fasteners.

The disc 208 has bent-over integral projections in the form of lugs 208b which are disposed at its periphery and extend axially toward and then along the disc 203. Those portions of the lugs 208b which are adjacent and contact the disc 203 extend radially outwardly and are traversed by the shanks of the rivets 209. The output element of the damper 201 is a flange 210 which is made of a synthetic material, and such output element has certain freedom of angular movement relative to the discs 203, 208 of the input element. The angular movement must take place against the opposition of energy storing elements in the form of coil springs 211 in the windows 203b, 208a and 210a of the discs 203, 208 and flange 210, respectively. The springs 211 are weaker than the springs 207.

As can be seen in FIG. 9, the flange 210 is non-rotatably mounted on a hub 212 having a toothed internal profile 212a for torque-transmitting connection with the input element of a change-speed transmission. The hub 212 can constitute a metallic part which is a forging or is made in an extrusion molding machine. The external surface of the hub 212 comprises a set of teeth 213 including a first section 213a with longer teeth (as measured radially of the hub 212) and a second section 213b with shorter teeth. The flange 205 of the damper 202 has internal teeth 205a in mesh with the external teeth 213a with a certain amount of angular play corresponding to the range of the damper 202. A friction lining 214 is effective within the entire range of the damper 201 (and hence within the entire range of the main damper 202), the same as the springs 211 as well as a moment of friction.

The synthetic flange 210 of the damper 201 abuts against a radially extending shoulder 215 of the hub 212 adjacent one axial end of the external toothed section 213b, and the radially innermost portion of the flange 210 has teeth 216 engaging the teeth 213b without angular play.

The external teeth 213 of the hub 212 further comprises an intermediate section 213c whose teeth are shorter than those of the section 213a but longer than the teeth of the section 213b. The section 213c is disposed between the sections 213a, 213b and is spacedly surrounded by the disc 203, i.e., the disc 203 has a certain freedom of radial play with reference to the section 213c. The sections 213a, 213c define a radial shoulder 215a which is axially offset from the aforementioned shoulder 215 between the sections 213b and 213c.

The friction lining 214 between the disc 204 and the flange 205 of the main damper 202 is a circumferentially complete washer and includes a radially innermost portion 217 having an L-shaped cross-sectional outline with a cylindrical portion 217a surrounding a peripheral surface 218 of the hub 212 and a radially extending portion 217b abutting the radially innermost portion of the disc 204. The internal surface of the disc 204 surrounds the axially extending portion 217a and abuts the adjacent side of the radially extending portion 217b. A corrugated ring-shaped (undulate) spring 219 is interposed in stressed condition between the radially extending portion 217b and the adjacent ends of long teeth 213a on the hub 212 to maintain the portion 217b in frictional engagement with the disc 204. The spring 219 further causes the radially innermost portion 200 of the disc 208 to bear against the radially innermost portion 210b of the flange 210 because the disc 208 is connected to the disc 203 by rivets 209 and the disc 203 is connected to the disc 204 by distancing elements in the form of rivets 225. Consequently, the radially innermost portion 210b of the flange 210 is biased against the radial shoulder 215 of the hub 212. Such stressing of the flange 210 by the spring 219 ensures that the input and output elements of the dampers 201 and 202 on the hub 212 are maintained in predetermined axial positions. The radially innermost portion 220 of the disc 208 abuts the axially enlarged radially innermost portion 210b of the flange 210.

The radially outermost portion 221 of the friction lining 214 constitutes a friction ring which is axially clamped between the disc 204 and the flange 205. This is accomplished by a diaphragm spring 222 which is installed between the disc 203 and the flange 205. The radially outermost portion of the spring 222 reacts against the flange 205 and its radially innermost portion bears against the disc 203. Thus, the flange 205 is biased axially toward the disc 204 to ensure that the ring 221 of the friction lining 214 is clamped between the parts 204 and 205.

The means for preventing rotation of the friction lining 214 relative to the disc 204 comprises projections 223 which are integral parts of the friction ring 221 and are received in complementary recesses 224 of the disc 204. Each projection 223 preferably constitutes a cylindrical stud so as to ensure that each of the recesses 224 can assume the shape of a simple circular hole which is formed in a stamping or like machine for the making of discs 204.

FIG. 9 further shows that the radially extending portion 217b of the radially innermost part 217 of the friction lining 214 is spaced apart from the friction surface 221a of the ring 221 in the axial direction of the hub 212. This results in the formation of an annular chamber 221b which is surrounded by the friction surface 221a. The chamber 221b accommodates the undulate spring 219 as well as those portions of longest teeth 213a on the hub 212 which extend axially to the right beyond the flange 205. Such design contributes to compactness of the clutch disc.

The right-hand side of the friction lining 214 has an annular depression 221c which is located opposite the friction surface 221a and receives an annular reinforcing bead 204a' of the disc 204.

The friction lining 214 is made of a friction generating or facing (slip generating) material which may but need not be a synthetic substance. It will be seen that the thickness of the friction lining 214 (as considered in the axial direction) is substantially constant due to the provision of the chamber 221b and depression 221c. This is desirable and advantageous when the friction lining is made in an injection molding machine from a synthetic material which is reinforced by filaments or fibers.

The flange 210 of the damper 201 is made of a wear-resistant synthetic material which can be reinforced by fibers or filaments to enhance its resistance to wear and its stability. This part can constitute a slip ring or friction ring so as to obviate the need for one or more separately produced rings which would contribute to the initial cost and assembly cost of the clutch disc. The axially reinforced radially innermost portion 210b of the flange 210 can be said to constitute a friction ring which cooperates with the radially innermost portion 220 of the disc 208.

The manner in which the friction linings on the radially outermost portion of the disc 203 can be clamped between the pressure plate and the flywheel of a friction clutch which is installed between the crankshaft of the internal combustion engine and the input shaft of the change-speed transmission is disclosed in numerous US patents of the assignee (reference may be had to such patents, if necessary) as well as in numerous pending applications of the assignee. For example, a single flywheel or a composite flywheel can be secured to the crankshaft by a set of bolts, and the pressure plate of the friction clutch can be caused to move toward the flywheel to clamp the friction linings on the disc 203 between the flywheel and the pressure plate in response to engagement of the friction clutch.

Starting from the neutral positions of the parts of the improved clutch plate, an angular displacement of the input element (discs 203, 208 which are non-rotatably secured to each other by the rivets 209) of the damper 201 relative to the hub 212 is opposed by the coil springs 211 of the damper 201, by the moment of friction which is generated as a result of fictional engagement between the radially innermost portions 220, 210b of the disc 208 and flange 210, by the moment of friction which is generated between the portion 217b of the friction lining 214 and the spring 219, and even by friction between the axially extending portion 217a of the friction lining 214 and the peripheral surface 218 of the hub 212. When the angular displacement of the flange 205 reaches that value at which the teeth 205a engage the adjacent teeth 213a, the flange 205 ceases to turn with reference to the hub 212 so that, if the discs 203, 204 continue to turn relative to the hub 212 and/or vice versa, the coil springs 207 of the main damper 202 start to store energy. The action of the springs 207 takes place in parallel to the friction damping action which develops as a result of friction between the ring 221 of the friction lining 214 and the flange 205 as well as due to friction between the diaphragm spring 222 and the disc 203. The main damper 202 is effective through an angle which is determined by the length (as considered in the circumferential direction of the clutch disc) of openings 226 which are provided in the flange 205 for the shanks of the rivets 225, i.e., the angular displacement ceases when a rivet 225 strikes the surface at the one or the other end of the respective opening 226.

In the embodiment of FIGS. 7 to 9, only the output element (flange 210) of the first damper 201 is made of a synthetic material. However, it is further within the purview of the invention to make the flange 210 and/or the input element (discs 203, 208) of the first damper from a suitable synthetic material. An advantage of a damper whose elements are made of a synthetic material, or include at least one element made of a synthetic material, is that the energy storing members (such as the aforedescribed coil springs 211) of the damper are more accurately and more reliably guided and held. This is due to the fact that the dimensions (e.g., the axial length) of a synthetic part (such as the flange 210) can be increased without appreciably increasing the weight of the clutch plate, i.e., the weight of an enlarged (thicker) flange 210 is still less than the weight of a thinner flange which is made of an acceptable metallic material. it is not even necessary to increase the thickness of the entire flange 210, as long as the thickness of such flange is more pronounced in the regions around the windows 210a. the synthetic material of the flange 210 can be reinforced by embedding suitable filamentary material in the synthetic mass or in the mold cavity of the machine which is used for mass-production of the flanges 210. the making of filament- or fiber-reinforced synthetic parts has been developed to such a degree that the parts can be used as highly satisfactory substitutes for numerous metallic parts, and applicant has recognized that even a component as sensitive and as important as a damper for use in a friction clutch plate can comprise one or more synthetic parts which can be used in lieu of heretofore customary metallic parts. Another important advantage of synthetic parts is that they can be readily designed to occupy space which is available in a clutch plate without unduly increasing the complexity of the mold and/or other parts of the machine which is used for the mass-production of such parts.

The synthetic element or elements of the damper 201 can be made of a wide variety of available synthetic materials which may but need not always be reinforced by fibers or filaments. The making of windows (210a) in the synthetic part (flange 210) of the damper 201 presents no problems and, by increasing the thickness of the element 210 around the windows 210a, the coil springs 211 can be properly and predictably held in conjunction with the surfaces bounding the respective windows 203b and 208a. Furthermore, the internal teeth 216 of the synthetic element 210 can reliably engage the adjacent section 213b of external teeth 213 on the hub 212 so as to ensure that the element 210 cannot turn relative to the hub and/or vice versa. As a rule, or at least in many instances, the hub 212 is made of a metallic material. In the illustrated embodiment of the damper 201, the discs 203 and 208 which constitute the input element of the damper 201 are made of metallic sheet stock.

The utilization of discs 203, 208 as the input element of the damper 201 exhibits the advantage that the flange 205 of the main damper 202 need not be provided with windows for the relatively weak coil springs 211 of the damper 201, i.e., that the flange 205 need not be weakened for the sole purpose of mounting therein portions of energy storing members forming part of the first damper. Consequently, the flange 205 of the main damper 202 can transmit greater torque.

The provision of internal threads 216 on the synthetic flange 210 of the damper 201 does not contribute to the cost of such part. Moreover, the flange 210 can be non-rotatably mounted on the hub 212 with a minimum of angular play, or without any play, by the simple expedient of forcing the teeth 216 between the teeth of the section 213b at the exterior of the hub 212. The term "teeth" is intended to embrace all kinds of acceptable profiles, such as tongues, ribs and the like, as long as they can be received in complementary tooth spaces, flutes or grooves with a selected angular play (as between the teeth 205a and 213a) or without any or with minimal lay (as between the teeth 216 and 213b).

The making of external teeth 213 on the hub 212 in the form of several sections 213a, 213b, 213c with one or more radially extending shoulders between such sections renders it possible to mount various parts on the hub at predetermined axial distances from each other as well as to limit the extent of axial movability of certain parts to a desired range. Thus, the undulate spring 219 can react against one of the shoulders (at the right-hand axial end of the section 213a, as viewed in FIG. 9), and the synthetic output element or flange 210 of the first damper 201 can abut the shoulder 215. The shoulder 215a limits the extent of axial movability of the disc 203 toward the flange 205 of the main damper 202.

The number of component parts of the clutch plate of FIGS. 7 to 9 is reduced due to the fact that the disc 203 of the input element of the first damper 201 constitutes a part of the input element 203, 204 of the main damper 202. This further simplifies the assembly of the clutch plate and of its dampers. It will be noted that the disc 203 (which is common to the input elements of both dampers) is disposed between the two output elements (flanges) 205 and 210.

The undulate spring 219 can be replaced by or can be used jointly with a diaphragm spring without departing from the spirit of the invention. Furthermore, the friction lining 214 can be replaced with a two-piece lining including a discrete first part which constitutes the friction ring 221 and a discrete second part 217 including the portions 217a and 217b.

An advantage of the feature that the spring 219 is capable of biasing the radially innermost portion 220 of the disc 208 against the radially innermost portion 210b of the flange 210, so that the latter bears against the radial shoulder 215 of the hub 212, is that the portion 210b can constitute a friction ring which is an integral part of the flange 210 and is maintained in proper frictional engagement with the portion 220 of the disc 208 to thus assist the action of the friction ring 214.

The distribution of various parts of the clutch plate of FIGS. 7 to 9 and of its dampers 201 and 202 in a manner as shown in FIGS. 8 and 9 brings about numerous additional advantages as concerns the simplicity of assembly and compactness of the clutch plate.

Figure 10:
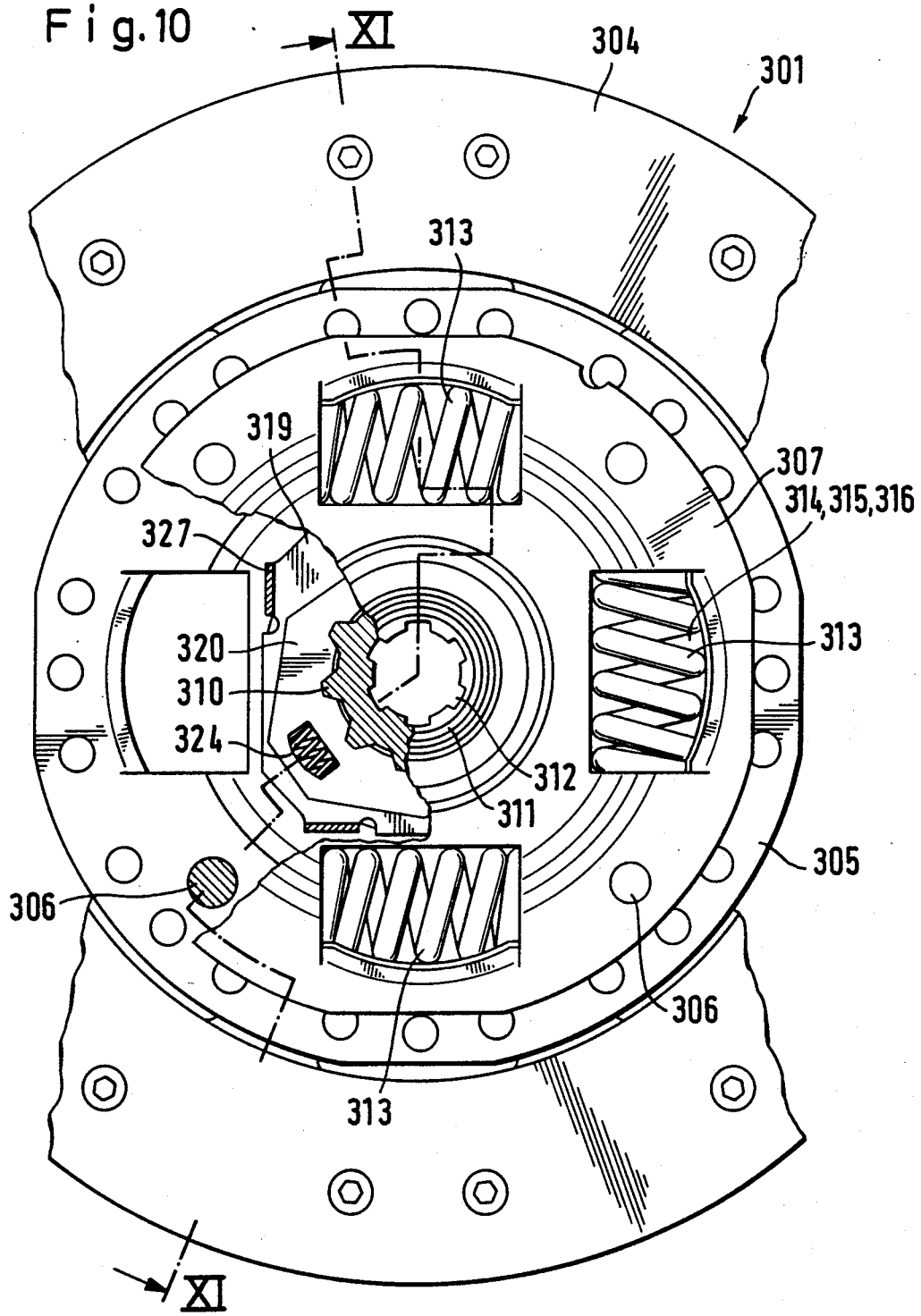
FIG. 10 is a fragmentary front elevational view of a clutch plate with a torsion damping assembly which embodies an additional form of the invention, a portion of the torsion damping assembly being broken away to show parts of the first damping stage.
Figure 11:
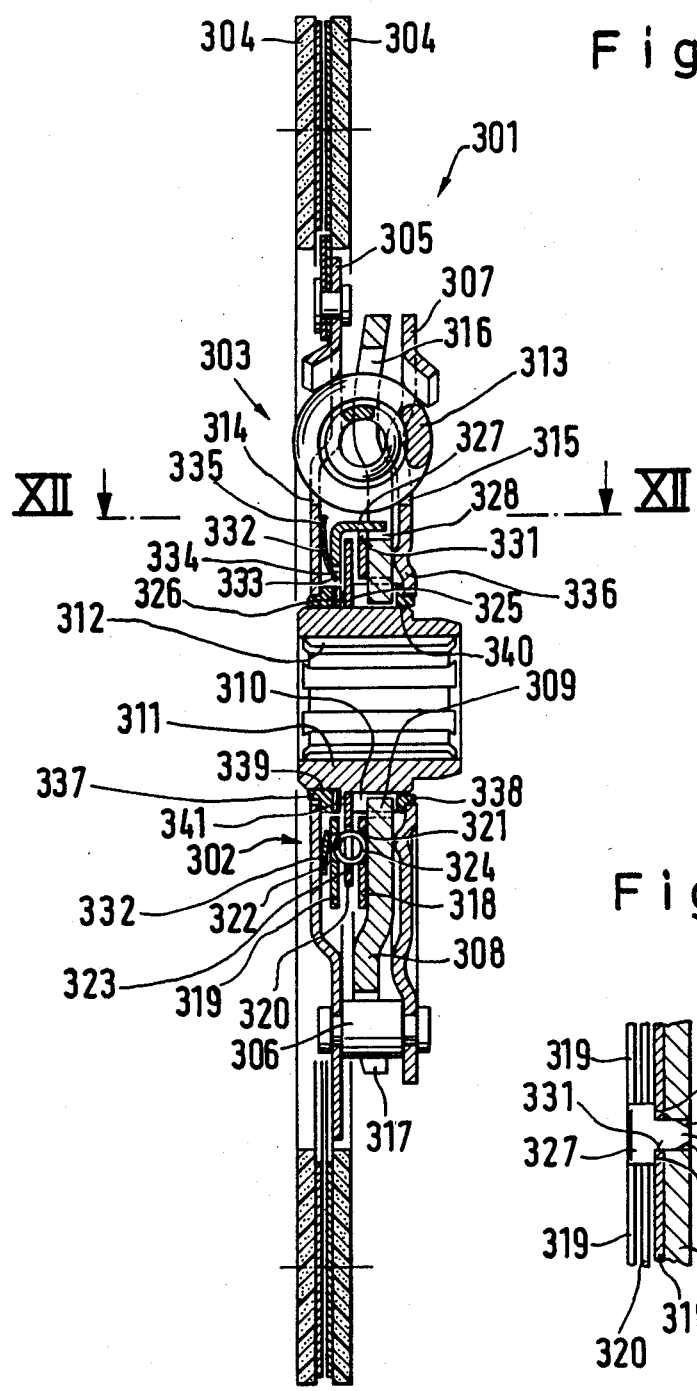
FIG. 11 is a sectional view as seen in the direction of arrows from the line XI—XI of FIG. 10.

Referring to FIGS. 10 and 11, there is shown a clutch disc or clutch plate 301 which comprises a first damping stage 302 and a second or main damping stage 303. The input component of the clutch plate 301 includes a disc-shaped carrier 305 for two friction linings 304, and the disc 305 simultaneously constitutes one part of the input member of the main damping stage 303. Such input component further comprises a second disc 307 which is rigidly secured to the disc 305 by a set of distancing elements 306 in the form of rivets. The output member of the main damping stage 303 is a flange 308 which has a set of internal teeth 309 mating with the external teeth 310 of a hub 311 which constitutes the output component of the clutch plate 301. The teeth 309 and 310 mate with a certain amount of play which determines the operating range of the first damping stage 302. The hub 311 is further formed with internal teeth 312 which mate with the external teeth of a driven element, e.g., with the external teeth of the input shaft of a change-speed transmission in a motor vehicle.

The main damping stage 303 further comprises energy storing coil springs 313 which are installed in registering windows 314, 315 of the discs 305, 307 on the one hand and in the windows 316 of the flange 308 on the other hand. The flange 308 can rotate (within limits) relative to the input member including the discs 305, 307 and the rivets 306 (and vice versa) against the opposition of the coil springs 313. The extent of such angular movability is determined by the length (as considered in the circumferential direction of the members 305, 307) of cutouts or slots 317 which are provided in the flange 308 and receive the median portions of the respective rivets 306. The number of cutouts or slots 317 may but need not match the number of rivets 306.

The first damping stage 302 is installed between the flange 308 and the disc 305, as considered in the axial direction of the clutch plate 301. The input element of the stage 302 includes two spaced-apart disc-shaped parts (hereinafter called plates) 318, 319 which are non-rotatably secured to the flange 308 and flank a disc-shaped second flange 320 constituting the output element of the first damping stage 302. The flange 320 is non-rotatably secured to the hub 311. The flange 320 and the elements 318, 319 can perform limited angular movements relative to each other due to the aforementioned play between the external teeth 310 of the hub 311 and the internal teeth 309 of the flange 308. Such angular movements must take place against the opposition of energy storing devices in the form of coil springs 324 which are received in the windows 321, 322 of the elements 318, 319 as well as in the windows 323 of the flange 320.

The flange 320 abuts a step or shoulder 325 at one axial end of the set of external teeth 310 on the hub 311, and this flange is formed with a set of internal teeth which mate with shallower portions of the teeth 310 in such a way that the flange 320 is compelled to share all angular movements of the hub 311. An upset portion 326 of the hub 311 maintains the flange 320 in contact with the shoulder or step 325.

Figure 12:
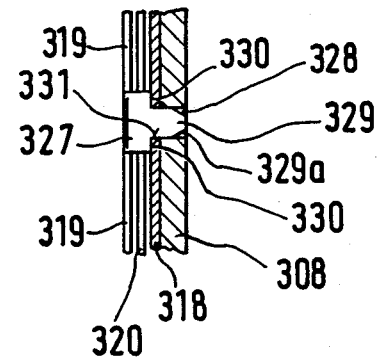
FIG. 12 is a fragmentary sectional view as seen in the direction of arrows from the line XII—XII of FIG. 11.

The plates 318, 319 which constitute the input element of the first damping stage 302 are form-lockingly connected to the flange 308 in such a way that they share the angular movements of the flange. To this end, the peripheral portion of the plate 319 (which is disposed between the disc 305 and the flange 320) is formed with form-locking projections in the form of lugs 327 which extend in substantial parallelism with the axis of the clutch plate 301 and into complementary recesses 328 of the flange 308. In the embodiment of FIGS. 10 to 12, the recesses 328 communicate with the windows 316 of the flange 308, i.e., with the openings which are provided in the flange 308 to receive portions of the energy storing coil springs 313. The lugs 327 extend axially beyond the disc-shaped flange 320 of the first damping stage 302 and their free end portions or tips 329 are of reduced width (see FIG. 12) and are received in corresponding recesses 328 of the flange 308. The wider and narrower portions of the lugs 327 define shoulders 330 which abut the respective side of the plate 318. The shoulders 330 maintain the plate 318 in contact with the respective side of the flange 308. The periphery of the plate 319 is formed with cutouts 331 for the narrower portions or tips 329 of the lugs 327 which hold the plate 319 in a preselected axial position. The tips 329 of the lugs 327 have wedge-like tapering portions 329a which facilitate the introduction of lugs 327 into the recesses 328 and cutouts 331 and thus allow for a reduction of the interval of time which is needed for assembly of the improved clutch plate 301. The plates 318 and 319 of the first damping stage 302 are biased axially by a dished spring 332 which reacts against the disc 305 and bears against the plate 319. The arrangement is preferably such that the radially outermost portion of the spring 332 contacts the disc 305 and the radially innermost portion of the spring 332 contacts the plate 319. This spring urges the shoulders 330 of the lugs 327 against the plate 318 whereby the plate 318 is urged against the flange 308. The spring 332 is provided with radially inwardly extending arms 333 which hold it against rotation relative to the flange 308 and, to this end, extend into cutouts 334 which are provided in the plate 319. The radially outermost portion of the dished spring 332 is preferably provided with a convex surface (as at 335) which is in frictional contact with the respective side of the disc 305. Such frictional contact is established and maintained because the spring 332 is installed in prestressed condition. Initial stressing of the spring 322 further ensures that the disc 305 pulls the disc 307 axially against the respective side of the flange 308. The radially innermost portion of the disc 307 has a corrugation 336 whose convex side is in frictional contact with the flange 308. Such frictional contact is established and maintained by the prestressed dished spring 332.

The discs 305 and 307 are mounted on the hub 311 with the interposition of two friction generating rings 337, 338 which respectively abut shoulders 339 and 340 of the hub 311. Each of the rings 337, 338 has a substantially L-shaped cross-sectional outline with the annular portion disposed adjacent the external surface of the hub 311 and with the radially disposed portion adjacent the inner side of the respective disc 305, 307. A spring in the form of an undulate washer 341 is installed in prestressed condition between the radially extending portion of the ring 339 for the disc 305 and the upset portion 326 of the hub 311. The washer 341 biases the disc 305 axially in a direction away from the external teeth 310 of the hub 311 and thereby ensures that the radially extending portion of the ring 338 for the disc 307 is clamped between the disc 307 and the end face of the set of external teeth 310 on the hub 311.

When the clutch plate 301 is held in a neutral position and its input component including the discs 305, 307 is caused to turn relative to the hub 311 or vice versa, such angular movement is opposed first by the energy storing coil springs 324 of the first damping stage 302 as well as by the friction generating rings 337, 338 for the discs 305 and 307. When the aforementioned play between the external teeth 310 of the hub 311 and the internal teeth 309 of the flange 308 is eliminated, the first damping stage 302 is rendered ineffective because further angular movement of the discs 305, 307 relative to the hub 311 and/or vice versa is opposed only by the energy storing coil springs 313 of the main damping stage 303. In addition to the springs 313, such further angular displacement of the members 305, 307 relative to the hub 311 is opposed by frictional forces which are generated by the rings 337, 338 for the discs 305, 307 as well as (and primarily) by the dished spring 332, which is in frictional engagement with the disc 305, and the corrugation 336 of the disc 307 which bears against the flange 308.

Figure 13:
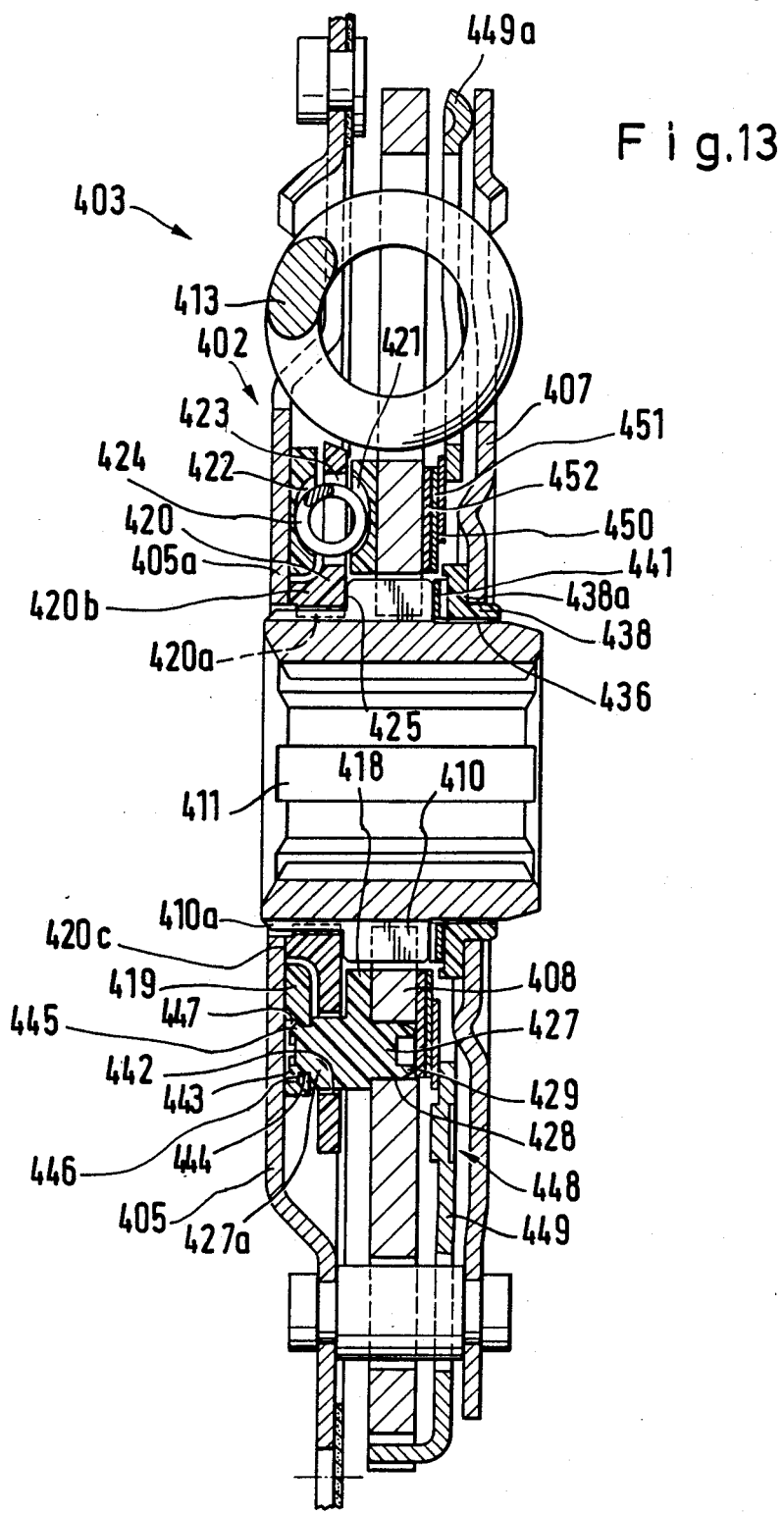
FIG. 13 is a fragmentary axial sectional view of a further torsion damping assembly.

FIG. 13 shows a portion of a modified clutch plate wherein all such parts which are identical with or clearly analogous to the corresponding parts of the clutch plate 301 are denoted by similar reference characters plus 100. The flange-like output element 420 of the first damping stage 402 is made of a synthetic material which is preferably reinforced by fibers and which bears axially against a shoulder 425 at one axial end of the set of external teeth 410 on the hub 411. The flange 420 is formed with an annulus of internal teeth 420a which mate with the modified portions 410a of the external teeth 410 so as to ensure that the hub 411 and the flange 420 cannot rotate relative to each other. The flange 420 is further formed with an axially extending annular portion 420b having an end face 420c which abuts the inner side of the radially innermost portion 405a of the disc 405. The disc 407 at the other axial end of the set of external teeth 410 is mounted on the ring 438 in such a way that it surrounds the annular portion of this ring and is adjacent one side of the radially extending portion 438a. The other side of the radially extending portion 438a of the ring 438 is engaged by a prestressed annular spring 441 in the form of an undulate washer which ensures that the flange 420 of the first damping stage 402 is clamped axially between the end face 425 of the set of external teeth 410 and the disc 405. Thus, when the disc 405 is caused to turn relative to the hub 411 and/or vice versa, such angular movement is opposed by friction between the radially innermost portion 405a of the disc 405 and the end face 420f annular portion 420b of the flange 420.

The input element of the first damping stage 402 again comprises two plates 418, 419 which are also made from a preferably fiber-reinforced synthetic material and are directly or indirectly and form-lockingly connected with the flange 408, i.e., with the output member of the main damping stage 403. The illustrated form-locking connection comprises pin-shaped projections 427 provided on the plate 418 (which is disposed between the flange 420 of the first damping stage 402 and the flange 408 of the main damping stage 403) and extending axially into the recesses or holes 428 of the flange 408. The free end portions or tips 429 of the pin-shaped projections 427 are resilient, as considered in the radial direction of the clutch plate, and engage the surfaces adjacent to the respective recesses 428 so that they are hooked to the flange 408. The plate 418 is further provided with a second set or group of projections 427a which extend axially in a direction away from the flange 408 and through cutouts or recesses 442 of the flange 420. The free end portions of the projections 427a are at least partly elastic, as considered in the radial direction of the clutch plate, and such at least partly elastic portions of the projections 427a extend axially through recesses or cutouts 444 of the clutch plate 419 so that their substantially hook-shaped portions 445 engage shoulders 446 of the plate 419 and thus hold the plate 419 against axial movement relative to the plate 418 and flange 408. The shoulders 446 of the plate 419 are formed by countersunk portions 447. The synthetic plate 419 is in direct frictional engagement with the disc 405 and serves to produce a frictional damping action for the main damping stage 403. Such construction of the clutch plate is desirable and advantageous because the number of friction rings can be reduced due to the fact that the plate 419 performs two functions, namely (a) it serves as a means for receiving portions of coil springs 424 forming part of the first damping stage 402, and (b) it constitutes a friction ring. Moreover, the first damping stage 402 can be produced at a relatively low cost because the plates 418, 419 and the flange 420 can constitute mass-produced extruded or otherwise formed synthetic articles. Still further, and as described before, such synthetic parts can be designed to ensure proper engagement of the plates 418, 419 and flange 408 with each other by a simple snap action so that they are held against axial and/or angular movement.

The plates 418, 419 and the flange 420 are respectively formed with windows 421, 422 and 423 for the energy storing coil springs 424 of the first damping stage 402.

A load friction generating device 448 between the flange 408 and the disc 407 comprises a washer 449 which cooperates with the energy storing coil springs 413 of the main damping stage 403. The radially outermost portion of the washer 449 is formed with one or more corrugations 449a which are in frictional damping contact with the respective side of the disc 407. A dished spring 450 bears against the radially innermost portion of the washer 449 to bias the latter axially against the disc 407 and to generate a frictional damping action. The dished spring 450 is installed in prestressed condition and reacts against a washer 451 which urges a friction generating washer 452 against the flange 418. The dished spring 450 further ensures that the plates 418, 419 of the first damping stage 402 are axially clamped between the flange 408 and the disc 405.

The clutch plate of FIGS. 10-13 is susceptible of many additional modifications without departing from the spirit of the invention. Furthermore, this clutch plate can be used not only in friction clutches for motor vehicles but also in many other types of clutches. The invention can be embodied in all or nearly all clutch plates of the type wherein the main damping stage has a disc-shaped member and a flange which is mounted on the hub of the clutch plate with a certain amount of angular play and wherein the springs of the first damping stage can be covered or overlapped by a disc-shaped member of the main damping stage.

An important advantage of the torsion damping assembly of FIGS. 10-13 is that its space requirements are surprisingly small. This is due to the fact that the entire first damping stage can be installed in the space between one of the discs 305, 307 or 405, 407 and the flange 308 or 408, i.e., in the space which is available in many clutch plates. Another important advantage of such mounting of the improved assembly is that the energy storing springs of the first damping stage are axially offset relative to the energy storing springs of the main damping stage so that the springs 313 or 413 and 324 or 424 can be placed nearer to each other, as considered in the radial direction of the clutch plate. This also contributes to reduced space requirements of the assembly.

The feature that the input element of the first damping stage comprises two axially spaced-apart plates and also contributes to compactness and particularly to simplicity of the assembly of FIGS. 10-13. Thus, the coil springs of the first stage can be installed in windows which are provided in the plates 309 rather than in windows of the flange 308 or 408, i.e., of the output member of the main damping stage. The provision of windows for the springs 324 or 424 in the flange 308 or 408 could entail undue weakening of such flange, especially since the flange 308 or 408 is already provided with windows for the larger and stronger coil springs 313 or 413 of the main damping stage. Consequently, the main damping stage can transmit pronounced torque. Still further, the mounting of each of the weaker coil springs 324 or 424 in three windows (321, 322 and 323 or 421, 422 and 423) ensures more reliable installation of such springs as considered in the radial as well as in the axial direction of the clutch plate.

Additional savings in space (as considered in the axial direction of the clutch plate) are achieved in that the plate 318 or 418 of the input element of the first damping stage abuts directly against the flange 308 or 408 (output member) of the main damping stage. The provision of form-locking projections 327 or 427, 427a on the plate 319 or 418 also contributes to compactness as well as to simplicity and lower cost of the torsion damping assembly because such lugs can hold the plate 319 or 419 at a desired axial distance from the plate 318 or 418 and flange 308 or 408, and the lugs can also hold the plates 318, 319 or 418, 419 against rotation relative to the flange 308 or 408. Still further, the shoulders 330 of the assembly of FIGS. 10-12 can bias the plate 318 against the flange 308. The making of lugs as integral parts of one of the two plates also contributes to simplicity, lower cost and compactness of the assembly and to a reduction of the assembly time. The recesses 328 or 428 can form part of the respective windows to further simplify the making of the flange 308 or 408. The provision of tapering portions 329a on the tips 329 of the lugs 327 contributes to convenience of assembling the two damping stages with each other and with other parts of the clutch plate 301.

In the embodiment of FIGS. 10-12, the spring 332 has arms 333 which serve as a means for non-rotatably coupling this spring to the plate 319 of the first damping stage 302. It is equally possible to have the legs 333 extend into adjacent recesses or cutouts of the disc 305 so that the spring 332 cannot rotate relative to the input component of the torsion damping assembly. The convex surface 335 is then provided at the other side of the spring 332 so that it is held in frictional engagement with the plate 319 of the first damping stage 302 or with the flange 308 of the main damping stage 303.

The flange of the first damping stage can be held against rotation relative to the hub in a number of different ways. Thus, such flange can have internal teeth (as shown at 420a in FIG. 13) which mate with the external teeth of the hub. Alternatively, or in addition thereto, the flange of the first damping stage can be axially clamped against a suitable shoulder or stop on the hub.

The features which are shown in FIG. 13 (namely wherein the input and/or output element of the first damping stage 402 consists of or contains a highly wear-resistant synthetic material) contribute to a reduction of the weight as well as to a lower cost of the improved torsion damping assembly. Certain other parts (note the ring 438 of FIG. 13) can also consist of a suitable wear-resistant friction generating material to further reduce the cost of the torsion damping assembly.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A torsional vibration damping device, particularly for use in a clutch plate of a friction clutch in a motor vehicle, comprising a first damper arranged to transmit a first moment and including a coaxial first rotary input and output elements and energy storing components interposed between and yieldably opposing angular movements of said elements relative to each other, each of said energy storing components extending substantially tangentially of said elements and including first and second end portions, at least one of said elements containing a non-metallic synthetic material and having substantially circumferentially extending substantially trough-shaped pockets for said energy storing components, said one element having pairs of abutments provided in said pockets adjacent the end portions of the respective components; and a second damper arranged to transmit a second moment greater than said first moment, said second damper having a rotary second input element, a rotary second output element and energy storing means arranged to oppose angular movements of said second elements relative to each other, said one first element being in frictional engagement with at least one element of said second damper.

2. The device of claim 1, wherein each of said components has a substantially circular cross-sectional outline and said one element surrounds each of said components along an arc of at least 180 degrees in the circumferential direction of said components.

3. The device of claim 1, wherein each of said components has a substantially circular cross-sectional outline and said one element contacts each of said components at two locations disposed substantially diametrically opposite each other.

4. The device of claim 1, wherein said one element is said input element.

5. The device of claim 1, wherein said one element has two substantially radially extending surfaces and said pockets are provided in one of said surfaces.

6. The device of claim 5, wherein said pockets are spaced apart from the other of said surfaces.

7. The device of claim 1, wherein said one element has arcuate grooves extending between neighboring pockets.

8. The device of claim 7, wherein said one element has two substantially radially extending surfaces, said pockets and said grooves being provided in one of said surfaces.

9. The device of claim 7, wherein the other of said first elements has projections extending into said grooves to engage the end portions of said components, at least in response to angular displacement of said first elements relative to each other.

10. The device of claim 9, wherein said components have substantially circular cross-sectional outlines and said projections extend substantially diametrically of said components.

11. The device of claim 9, wherein said other first element is the output element of said first damper.

12. The device of claim 9, wherein said other first element is the input element of said first damper.

13. The device of claim 1, wherein said one first element has a substantially radially extending surface and said pockets are provided in said surface, said one first element having a pair of facets in each of said pockets and the facets of each pair being spaced apart from each other and extending from said surface outwardly and away from the common axis of said first elements.

14. The device of claim 13, wherein each of said pockets has a radially outermost portion and said one first element has undercut portions defining the outermost portions of said pockets.

15. The device of claim 1, further comprising two coaxial members flanking said first damper, said one first element being in frictional engagement with one of said members.

16. The device of claim 1, wherein said one first element has a substantially radially extending surface and said pockets are provided in said surface, said one first element further having arcuate grooves provided in said surface and extending between neighboring pockets, the other of said first elements containing a metallic material and including an annular portion and projections provided on said annular portion and extending substantially axially of said first elements and into said grooves to engage the adjacent components, at least in response to angular displacement of said first elements relative to each other.

17. The device of claim 16, further comprising a hub having external teeth, said other first element having internal teeth mating with said external teeth.

18. The device of claim 1, further comprising means for clamping said one first element between said second output element and said one wall.

19. The device of claim 1, wherein the other of said first elements is disposed between said one first element and said second output element.

20. The device of claim 19, wherein said second output element and said first output element are adjacent to but out of contact with each other.

21. The device of claim 1, further comprising means for non-rotatably connecting said one first element with said second output element, said second output element and said one first element defining a ring-shaped chamber for the other of said first elements and said one first element extending radially outwardly beyond said other first element.

22. The device of claim 1, wherein said one first element has at least one substantially axially extending projection and said second output element has a socket for said projection so that said second output element and said one first element are held against rotation relative to each other.

23. The device of claim 1, wherein said one first element and said second output element are movable relative to each other in the axial direction of said first elements and further comprising means for biasing said one first element and said second output element axially toward each other.

24. The device of claim 23, wherein said biasing means comprises a resilient element interposed between said second output element and the other of said walls.

25. The device of claim 24, wherein said resilient element includes a prestressed diaphragm spring which reacts against said second output element and bears against said other wall to urge said one wall against said one first element and to thereby urge said one first element against said second output element.

26. The device of claim 1, wherein said one first element has at least one ramp provided in each of said pockets to facilitate introduction of said components into the respective pockets.

27. The device of claim 26, wherein said one first element has a substantially radially extending surface and said pockets are provided in said surface, said ramps extending substantially between the pairs of abutments in the respective pockets.

28. The device of claim 1, wherein one of said first elements is disposed radially outwardly of and at least partly surrounds the other of said first elements.

29. The device of claim 28, wherein said first input element surrounds said first output element.

30. The device of claim 28, wherein said first elements are disposed in or close to a common plane extending at right angles to the common axis of said first elements.

31. The device of claim 1, further comprising two substantially disc-shaped walls spaced apart from each other in the axial direction of said first elements, said second output element being disposed between said walls and said first damper being disposed between said second output element and one of said walls.

32. The device of claim 1, further comprising means for form-lockingly connecting said first elements with said second output element.

33. The device of claim 1, wherein said first input element has axially extending projections extending into recesses provided in said second output element.

34. The device of claim 33, wherein said projections have relatively large main portions, relatively small end portions and shoulders between said end portions and the respective main portions, said first output element having cutouts for said end portions and abutting said shoulders and being spaced apart by the shoulders from said first input element.

35. A torsional vibration damping device, particularly for use in a clutch plate of a clutch of a motor vehicle, comprising a hub connectable with input means of a transmission and having external teeth; and first and second dampers respectively arranged to transmit a relatively small first moment and a larger second moment, said first damper comprising a torque-receiving first input element, a first output element non-rotatably mounted on said hub and first energy storing means arranged to oppose rotation of said elements relative to each other, at least one of said elements containing a non-metallic synthetic material, said second damper comprising a metallic second input element, a metallic second output element having internal teeth mating with a predetermined play with the external teeth of said hub, and second energy storing means arranged to oppose angular movements of said second elements relative to each other, said one first element being in frictional arrangement with at least one of said second damper elements.

36. The device of claim 35, wherein said first output element consists of a synthetic material, said first elements having registering windows and said first energy storing means being installed in said windows, at least the external teeth of said hub consisting of a metallic material.

37. The device of claim 35, wherein said first input element comprises two spaced-apart metallic discs and means for non-rotatably securing said discs to each other, said first output element comprising a flange disposed between said discs.

38. The device of claim 35, wherein said first output element comprises a flange which contains a synthetic material and has internal teeth mating with the external teeth of said hub.

39. The device of claim 38, wherein the internal teeth of said flange and the external teeth of said hub mate without play in the circumferential direction of said hub.

40. The device of claim 35, wherein said hub has internal teeth arranged to engage the external teeth of the input means and said first output element has internal teeth mating with the external teeth of said hub.

41. The device of claim 35, wherein said external teeth include a first section mating with the internal teeth of said second output element and a second section, said first output element having internal teeth mating with said second section and the teeth of said first section being longer than the teeth of said second section in the radial direction of said hub.

42. The device of claim 41, wherein said hub has at least one radial shoulder between said sections and said one first element abuts said shoulder.

43. The device of claim 41, wherein said external teeth include a third section which is disposed between said first and second sections in the axial direction of said hub and whose teeth are shorter than the teeth of said first section but longer than the teeth of said second section.

44. The device of claim 35, wherein said second input element comprises a disc forming part of said first input element.

45. The device of claim 44, further comprising a spring disposed between said second output element and said disc and arranged to bias said disc and said second output element axially of said hub and away from each other.

46. The device of claim 45, wherein said spring is a diaphragm spring having a radially outer portion engaging said second output element and a radially inner portion engaging said disc.

47. The device of claim 44, wherein said first input element further comprises a second disc and means for non-rotatably coupling said discs to each other, said one first element constituting the output element of said first damper and being disposed between said discs.

48. The device of claim 44, wherein said second input element comprises a second disc and said second output element is disposed between said discs in the axial direction of said hub, and further comprising a spring reacting against said hub and arranged to bias said second disc axially and away from said second output element.

49. The device of claim 48, wherein said spring is an undulate spring which is installed in stressed condition.

50. The device of claim 48, further comprising a friction lining interposed between said spring and said second disc in the axial direction of said hub, said spring being mounted to react directly against the external teeth of said hub.

51. The device of claim 48, wherein said spring is arranged to bias said first input and output elements axially of said hub and against each other, said hub having an external shoulder and said first output element abutting said shoulder under the action of said spring.

52. The device of claim 35, further comprising a friction lining interposed between the input and output elements of said second damper.

53. The device of claim 35, wherein said first input element comprises coaxial first and second discs and means for non-rotatably coupling said discs to each other, said discs being spaced apart from each other in the axial direction of said hub and said first output element comprising a first flange containing a synthetic material and interposed between said discs, said discs and said flange having registering first windows and said first energy storing means comprising a coil spring in said windows, and further comprising friction linings provided on said second disc, said second disc forming part of said second input element and said second input element further comprising a third disc surrounding said hub and spaced apart axially from said second disc and means for non-rotatably coupling said second and third discs to each other, said second output element comprising a second flange disposed between said second and third discs, said second and third discs and said second flange having registering second windows and said second energy storing means comprising a coil spring in said second windows, and further comprising a spring disposed between said second disc and said second flange and arranged to bias said second disc and said second flange axially of said hub and away from each other, and a friction ring interposed between said second flange and said third disc.

54. The device of claim 35, wherein said first energy storing means comprises a plurality of energy storing components and said one first element has substantially circumferentially extending pockets for said components, each of said energy storing components extending substantially tangentially of said first elements and including first and second end portions, said one first element having pairs of abutments provided in said pockets adjacent the end portions of the respective components.

55. The device of claim 54, wherein each of said components has a substantially circular cross-sectional outline and said one first element surrounds each of said components along an arc of at least 180 degrees in the circumferential direction of said components.

56. The device of claim 54, wherein each of said components has a substantially circular cross-sectional outline and said one first element contacts each of said component two locations disposed substantially diametrically opposite each other.

57. The device of claim 54, wherein said one first element is said first output element.

58. The device of claim 54, wherein said one first element is said first input element.

59. The device of claim 54, wherein said one first element has two substantially radially extending surfaces and said pockets are provided in one of said surfaces.

60. The device of claim 59, wherein said pockets are spaced apart from the other of said surfaces.

61. The device of claim 54, wherein said one first element has arcuate grooves extending between neighboring pockets.

62. The device of claim 61, wherein said one first element has two substantially radially extending surfaces, said pockets and said grooves being provided in one of said surfaces.

63. The device of claim 61, wherein the other of said first elements has projections extending into said grooves to engage the end portions of said components, at least in response to angular displacement of said first elements relative to each other.

64. The device of claim 63, wherein said component have substantially circular cross-sectional outlines and said projections extend substantially diametrically of said components.

65. The device of claim 63, wherein the other of said first elements is the output element of said first damper.

66. The device of claim 63, wherein the other of said first elements is the input element of the first damper.

67. The device of claim 54, wherein said one first element has a substantially radially extending surface and said pockets are provided in said surface, said one first element having a pair of facets in each of said pockets and the facets of each pair being spaced apart from each other and extending from said surface outwardly and away from the common axis of said first elements.

68. The device of claim 67, wherein each of said pocket has a radially outermost portion and said one first element has undercut portions defining the outermost portions of said pockets.

69. The device of claim 54, further comprising two coaxial members flanking said first damper, said one first element being in frictional engagement with one of said members.

70. The device of claim 54, wherein said one first element has a substantially radially extending surface and said pockets are provided in said surface, said one first element further having arcuate grooves provided in said surface and extending between neighboring pockets, the other of said first elements containing a metallic material and including an annular portion and projections provided on said annular portion and extending substantially axially of said first elements and into said grooves to engage the adjacent components, at least in response to angular displacement of said first elements relative to each other.

71. The device of claim 70, wherein the other of said first elements has internal teeth making with said external teeth.

72. The device of claim 35, wherein said second input element comprises two substantially disc-shaped walls spaced apart from each other in the axial direction of said first elements, said second output element being disposed between said walls and said first damper being disposed between said second output element and one of said walls.

73. The device of claim 72, further comprising means for clamping said one first element between said second output element and said one wall.

74. The device of claim 72, wherein the other of said first elements is disposed between said one first element and said second output element.

75. The device of claim 74, wherein said output elements are adjacent to but out of contact with each other.

76. The device of claim 35, further comprising means for non-rotatably connecting said one first element with said second output element, said second output element and said one first element defining a ring-shaped chamber for the other of said first elements and said one first element extending radially outwardly beyond said other first element.

77. The device of claim 35, wherein said one first element has at least one substantially axially extending projection and said second output element has a socket for said projection so that said second output element and said one first element are held against rotation relative to each other.

78. The device of claim 35, wherein said one first element and said second output element are movable relative to each other in the axial direction of said first elements and further comprising means for biasing said one first element and said second output element axially toward each other.

79. The device of claim 78, wherein said second input element comprises two substantially disc-shaped walls which are spaced apart from each other in the axial direction of said first elements, said biasing means comprising a resilient element interposed between said second output element and one of said walls.

80. The device of claim 79, wherein said resilient element includes a prestressed diaphragm spring which reacts against said second output element and bears against said one wall to urge the other of said walls against said one first element and to thereby urge said one first element against said second output elements.

81. The device of claim 35, wherein said first energy storing means comprises a plurality of energy storing components and said one first element has substantially circumferentially extending pockets for said components, each of said energy storing components extending substantially tangentially of said first elements and including first and second end portions, said one first element having pairs of abutments provided in said pockets adjacent the end portions of the respective components, said one first element further having at least one ramp provided in each of said pockets to facilitate introduction of said components into the respective pockets.

82. The device of claim 81, wherein said one first element has a substantially radially extending surface and said pockets are provided in said surface, said ramps extending substantially between the pairs of abutments in the respective pockets.

83. The device of claim 35, wherein one of said first elements is disposed radially outwardly of and at least partially surrounds the other of said first elements.

84. The device of claim 83, wherein said first input element surrounds said first output element.

85. The device of claim 83, wherein said first elements are disposed in or close to a common plane extending at right angles to the common axis of said first elements.

86. The device of claim 35, wherein said first energy storing means comprises a plurality of energy storing components and said one first element has first pockets for said components, the other of said first elements having second pockets complementary to the pockets of said one first element, each of said components being disposed in one pocket of said one first element and in the complementary pocket of said other first element.

87. A torsional vibration damping device, particularly for use in a clutch plate of a clutch of a motor vehicle, comprising a first damper including first rotary input and output elements and first energy storing means operating between said elements and having a first rigidity; a second damper including second input and output elements and second energy storing means operating between said second elements and having a second rigidity greater than said first rigidity; output means including a hub having an internally profiled portion arranged to surround a transmission shaft, said first output element being non-rotatably connected with said hub and said second output element including a flange having an internal profile, said hub having an external profile engaging said internal profile with limited freedom of angular movement; input means including two axially spaced-apart walls flanking said flange, said first damper being disposed between said flange and one of said walls and said first input element including two axially spaced-apart substantially disc-shaped members non-rotatably connected with said flange, said first output element being non-rotatably connected with said output means and including a flange-like component disposed between said disc-shaped members and having an internal profile surrounding and conforming to the external profile of said hub, said flange-like component being maintained in a predetermined axial position with reference to said hub by an upset portion of said hub and axially stressed resilient means operating between said first damper and one of said walls.

88. A torsional vibration damping device, particularly for use in a clutch plate of a clutch of a motor vehicle, comprising a first damper including rotary first input and output elements and first energy storing means operating between said elements and having a first rigidity, at least one of said elements containing a non-metallic synthetic material; a second damper including second input and output elements and second energy storing means operating between said second elements and having a second rigidity greater than said first rigidity; output means including a hub having an internally profiled portion arranged to surround a transmission shaft, said first output element being non-rotatably connected with said hub and said second output element including a flange having an internal profile, said hub having an external profile engaging said internal profile with limited freedom of angular movement; and input means including two axially spaced-apart walls flanking said flange, said first damper being disposed axially between said flange and one of said walls.

89. The device of claim 88, wherein said first input element is in frictional engagement with said second input element.

90. The device of claim 88, wherein one of said first input and output elements comprises a plurality of axially extending projections cooperating with the other of said first input and output elements to maintain said first input and output elements in axially spaced apart positions relative to each other.

91. The device of claim 88, further comprising means for coupling said first input and output elements to each other against axial movement away from one another.

92. A torsional vibration damping device, particularly for use in a clutch plate of a clutch of a motor vehicle, comprising a first damper including rotary first input and output elements and first energy storing means operating between said elements and having a first rigidity; a second damper including second input and output elements and second energy storing means operating between said second elements and having a second rigidity greater than said first rigidity, said second input element having a plurality of components; output means including a hub having an internally profiled portion arranged to surround a transmission shaft, said first output element being non-rotatably connected with said hub and said second output element including a flange having an internal profile, said hub having an external shoulder and an external profile engaging said internal profile with limited freedom of angular movement; input means having two axially spaced-apart walls flanking said flange, said first damper being disposed axially between said flange and one of said walls; an L-shaped friction ring interposed between said shoulder and at least one of said walls; and resilient means axially interposed between said external profile and said ring to urge said at least one wall axially of said hub and away from said external profile.

93. The device of claim 92, wherein said external profile is disposed between said first output elements and said resilient means.

94. The device of claim 87 or 88 or 92, wherein said first input element comprises two axially spaced-apart disc-shaped members non-rotatably connected with said flange and having windows receiving portions of said first energy storing means.

95. The device of claim 94, wherein said first output element includes a flange which is non-rotatably connected with said output means between said walls and has windows for portions of said first energy storing means.

96. The device of claim 87 or 88 or 92, wherein said first input element includes two disc-shaped members and one of said disc-shaped members directly contact said flange.

97. The device of claim 87 or 88 or 92, wherein said first input element has two disc-shaped members, and further comprising means for form-lockingly connecting said disc-shaped members with said flange.

98. The device of claim 87 or 88 or 92, wherein said first input element comprises two substantially disc-shaped members one of which is nearer to and the other of which is more distant from said flange, said flange having recesses and said other disc-shaped member having lugs extending axially into said recesses.

99. The device of claim 98, wherein at least some of said lugs have relatively large main portions, relatively small end portions and shoulders between said end portions and the respective main portions, said end portions extending into the respective recesses.

100. The device of claim 99, wherein said one disc-shaped member has cutouts for the end portions of said lugs so that said lugs hold said one disc-shaped member against rotation relative to said flange and determine the axial position of said one disc-shaped member.

101. The device of claim 100, wherein said shoulders abut said one disc-shaped member.

102. The device of claim 99, wherein the dimensions of said end portions of said lugs decrease in a direction away from the respective main portions.

103. The device of claim 98, further comprising resilient means for biasing said other disc-shaped member axially toward said flange.

104. The device of claim 103, wherein said biasing means includes a prestressing spring disposed between said other disc-shaped member and one of said walls.

105. The device of claim 87 or 88 or 92, wherein the other of said walls includes a friction generating projection directly abutting said flange.

106. The device of claim 105, wherein said other wall has a radially innermost portion and a radially outermost portion, said projection being adjacent said innermost portion.

107. The device of claim 87 or 88 or 92, wherein said walls constitute said second input element.

108. The device of claim 87 or 88 or 92, further comprising at least one friction lining on said one wall.

109. The device of claim 87 or 88, further comprising at least one friction lining on said wall and an L-shaped friction ring between said one wall and said hub.

110. The device of claim 88 or 92, wherein said first output element includes a flange bearing axially against the external profile of said hub.

111. The device of claim 87 or 92, wherein at least one of said first elements contains a synthetic material.

112. The device of claim 111, wherein said one first element is said first output element, said first output element having windows and said first energy storing means including energy storing members disposed in said windows, extending substantially tangentially of said hub and arranged to transmit moments to said output means.

113. The device of claim 111, wherein said one first element has internal teeth and said output means has external teeth mating with said internal teeth.

* * * * *